(12) United States Patent
Calilung et al.

(10) Patent No.: US 9,709,817 B2
(45) Date of Patent: Jul. 18, 2017

(54) EYEWEAR RETENTION DEVICES AND METHODS

(71) Applicant: Oakley, Inc., Foothill Ranch, CA (US)

(72) Inventors: Ryan Anthony Calilung, Irvine, CA (US); Nathan Heronen, Mission Viejo, CA (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 14/961,715

(22) Filed: Dec. 7, 2015

(65) Prior Publication Data

US 2017/0160563 A1    Jun. 8, 2017

(51) Int. Cl.
G02C 5/14 (2006.01)
G02C 5/16 (2006.01)
G02C 11/00 (2006.01)

(52) U.S. Cl.
CPC ............... G02C 5/146 (2013.01); G02C 5/16 (2013.01); G02C 11/00 (2013.01)

(58) Field of Classification Search
CPC .................................................... G02C 11/00
USPC ......................................................... 351/112
See application file for complete search history.

(56) References Cited

U.S. PATENT DOCUMENTS

| | | |
|---|---|---|
| 245,268 A | 8/1881 | Andross |
| 1,206,457 A | 11/1916 | Mills |
| 1,308,477 A | 7/1919 | Blanchard |
| 1,588,775 A | 6/1926 | Schumacher |
| 1,839,386 A | 1/1932 | Fischer |
| 1,910,456 A | 5/1933 | Baker |
| 1,918,954 A | 7/1933 | Baker |
| 1,942,393 A | 1/1934 | Baker |
| 1,943,910 A | 1/1934 | Baker |
| 2,042,400 A * | 5/1936 | Hon .................. G02C 3/04 351/112 |
| 2,098,512 A * | 11/1937 | Nerney .................. G02C 1/02 351/110 |
| 2,391,361 A | 12/1945 | Stevenson |
| 2,443,422 A | 6/1948 | Hansen |
| 2,504,157 A | 4/1950 | Rosenheim |

(Continued)

FOREIGN PATENT DOCUMENTS

| | | |
|---|---|---|
| CN | 201780416 | 3/2011 |
| DE | 102004058631 | 6/2006 |

(Continued)

OTHER PUBLICATIONS

PIVLOCK V2—Smith Optics Elite, dated Nov. 7, 2013, available at: https://www.youtube.com/watch?v=WIVQVmO1x0g.
Oakley Wind Jacket, released at least as early as Aug. 30, 2011.

*Primary Examiner* — Huy K Mai
(74) *Attorney, Agent, or Firm* — Knobbe Martens Olson & Bear, LLP

(57) ABSTRACT

Eyewear can be provided that include at least a support and a retention system that allows the eyewear to be retained on an object separate from the eyewear. The support can include at least an earstem and a face. The retention system can include a retention member coupled to a portion of the support which can retain the object between the retention member and the support. The retention system can also include an actuation member which can transition the retention system, such as the retention member, from a retention configuration to an open configuration.

20 Claims, 14 Drawing Sheets

(56) References Cited

U.S. PATENT DOCUMENTS

| | | | |
|---|---|---|---|
| 2,652,746 A | 12/1950 | Shanks |
| 2,556,847 A | 6/1951 | MacLean |
| 2,610,323 A | 9/1952 | Johnson |
| 2,671,379 A | 3/1954 | Eloranta |
| 2,799,862 A | 7/1957 | Rowe |
| 3,084,595 A | 4/1963 | Watts et al. |
| 3,214,767 A | 11/1965 | Weber |
| 3,229,303 A | 1/1966 | Jonassen |
| 3,233,250 A | 2/1966 | Jonassen |
| 3,383,707 A | 5/1968 | McNeill |
| 3,395,964 A | 8/1968 | Chartrice |
| 3,552,840 A | 1/1971 | Braget |
| 3,659,931 A | 5/1972 | Allen |
| 3,691,565 A | 9/1972 | Galonek |
| 3,826,564 A | 7/1974 | Werling, Sr. |
| 3,829,201 A | 8/1974 | Whiting |
| 3,901,589 A | 8/1975 | Bienenfeld |
| 3,931,646 A | 1/1976 | Loughner |
| 4,023,214 A | 5/1977 | Waldherr |
| 4,056,853 A | 11/1977 | Bottazzini et al. |
| 4,153,347 A | 5/1979 | Myer |
| 4,176,921 A | 12/1979 | Matthias |
| 4,178,080 A | 12/1979 | Elder |
| 4,264,987 A | 5/1981 | Runckel |
| 4,304,469 A | 12/1981 | Solomon |
| 4,314,814 A | 2/1982 | Deroode |
| 4,331,393 A | 5/1982 | Bradley, Jr. |
| 4,340,282 A | 7/1982 | Murakami |
| 4,357,080 A | 11/1982 | Solomon |
| 4,471,496 A | 9/1984 | Gardner, Jr. et al. |
| 4,515,448 A | 5/1985 | Tackles |
| 4,527,291 A | 7/1985 | Nussbickl |
| 4,616,367 A | 10/1986 | Jean et al. |
| 4,632,526 A | 12/1986 | Lhospice |
| 4,662,966 A | 5/1987 | Sumi et al. |
| 4,670,084 A | 6/1987 | Durand |
| 4,674,851 A | 6/1987 | Jannard |
| 4,686,712 A | 8/1987 | Spiva |
| 4,715,702 A | 12/1987 | Dillon |
| 4,730,915 A | 3/1988 | Jannard |
| 4,759,622 A | 7/1988 | Schmidthaler |
| 4,813,775 A | 3/1989 | Kaksonen |
| 4,822,158 A | 4/1989 | Porsche |
| 4,843,655 A | 7/1989 | Hegendorfer |
| 4,859,048 A | 8/1989 | Jannard |
| 4,867,550 A | 9/1989 | Jannard |
| 4,878,749 A | 11/1989 | McGee |
| 4,901,374 A | 2/1990 | Van der Woude |
| 4,951,322 A | 8/1990 | Lin |
| 4,978,209 A | 12/1990 | Ohba |
| 4,983,030 A | 1/1991 | Chandler |
| 5,007,727 A | 4/1991 | Kahaney et al. |
| 5,016,293 A | 5/1991 | Lickle |
| 5,048,944 A | 9/1991 | Porsche |
| 5,056,163 A | 10/1991 | Chou |
| 5,069,541 A | 12/1991 | Holmes et al. |
| 5,144,344 A | 9/1992 | Takahashi et al. |
| 5,170,502 A | 12/1992 | Hegendorfer et al. |
| 5,182,586 A | 1/1993 | Bennato |
| 5,182,587 A | 1/1993 | Hyoi |
| 5,191,364 A | 3/1993 | Kopfer |
| 5,208,614 A | 5/1993 | Jannard |
| 5,257,050 A | 10/1993 | Wiedner |
| 5,270,743 A | 12/1993 | Hofmair et al. |
| 5,291,230 A | 3/1994 | Bradley |
| 5,308,426 A | 5/1994 | Claveau |
| 5,357,292 A | 10/1994 | Wiedner |
| 5,359,370 A | 10/1994 | Mugnier |
| 5,373,331 A | 12/1994 | Vallalla et al. |
| 5,379,463 A | 1/1995 | Schleger et al. |
| 5,387,949 A | 2/1995 | Tackles |
| 5,390,369 A | 2/1995 | Tubin |
| 5,400,089 A | 3/1995 | Danloup et al. |
| 5,410,763 A | 5/1995 | Bolle |
| 5,412,438 A | 5/1995 | Bolle |
| 5,418,580 A | 5/1995 | Sondrol |
| 5,418,581 A | 5/1995 | Conway |
| 5,423,092 A | 6/1995 | Kawai |
| 5,428,407 A | 6/1995 | Sheffield |
| 5,455,639 A | 10/1995 | Magdelaine et al. |
| 5,467,148 A | 11/1995 | Conway |
| 5,493,348 A | 2/1996 | Herald, Jr. et al. |
| 5,536,828 A | 7/1996 | Deluca et al. |
| 5,541,674 A | 7/1996 | Jannard |
| 5,550,599 A | 8/1996 | Jannard |
| 5,576,775 A | 11/1996 | Bolle |
| 5,583,583 A | 12/1996 | Wilson |
| 5,587,747 A | 12/1996 | Bernheiser |
| 5,602,603 A | 2/1997 | Bondet |
| 5,608,470 A | 3/1997 | Sheffield |
| 5,610,668 A | 3/1997 | Mage |
| 5,617,588 A | 4/1997 | Canavan et al. |
| 5,619,287 A | 4/1997 | Tseng |
| 5,638,145 A | 6/1997 | Jannard et al. |
| 5,641,372 A | 6/1997 | Okuno |
| 5,648,832 A | 7/1997 | Houston et al. |
| 5,652,954 A | 8/1997 | Paiement et al. |
| 5,657,106 A | 8/1997 | Herald et al. |
| 5,685,022 A | 11/1997 | Essman et al. |
| 5,689,323 A | 11/1997 | Houston et al. |
| 5,708,489 A | 1/1998 | Jannard |
| 5,727,251 A | 3/1998 | Sherlock et al. |
| 5,752,280 A | 5/1998 | Hill |
| 5,760,866 A | 6/1998 | Wedeck et al. |
| 5,765,223 A | 6/1998 | McCausland |
| 5,768,716 A | 6/1998 | Porsche |
| 5,790,230 A | 8/1998 | Sved |
| 5,793,463 A | 8/1998 | Hirschman et al. |
| 5,796,461 A | 8/1998 | Stepan |
| 5,798,017 A | 8/1998 | Claveau |
| 5,802,622 A | 9/1998 | Baharad et al. |
| 5,805,261 A | 9/1998 | Houston et al. |
| 5,809,580 A | 9/1998 | Arnette |
| 5,815,235 A | 9/1998 | Runckel |
| 5,841,506 A | 11/1998 | Karasawa et al. |
| 5,862,529 A | 1/1999 | Moodie et al. |
| 5,898,468 A | 4/1999 | Mage |
| 5,898,469 A | 4/1999 | Wang |
| 5,903,331 A | 5/1999 | Lin |
| 5,914,767 A | 6/1999 | Wedeck et al. |
| 5,929,963 A | 7/1999 | McNeal |
| 5,956,116 A | 9/1999 | Ishiyama |
| 5,963,293 A | 10/1999 | Jannard |
| 5,969,789 A | 10/1999 | Houston et al. |
| 5,971,536 A | 10/1999 | Chiu |
| 5,971,538 A | 10/1999 | Heffner |
| 5,987,702 A | 11/1999 | Simioni |
| 6,007,199 A | 12/1999 | Yang |
| 6,009,564 A | 1/2000 | Tackles et al. |
| 6,010,217 A | 1/2000 | Houston et al. |
| 6,010,218 A | 1/2000 | Houston et al. |
| 6,047,410 A | 4/2000 | Dondero |
| 6,056,399 A | 5/2000 | Jannard et al. |
| 6,062,688 A | 5/2000 | Vinas |
| D428,620 S | 7/2000 | Maturaporn |
| 6,086,199 A | 7/2000 | Holland et al. |
| 6,094,751 A | 8/2000 | Parks |
| 6,098,204 A | 8/2000 | Arnette |
| 6,102,033 A | 8/2000 | Baribeau |
| 6,105,177 A | 8/2000 | Paulson et al. |
| 6,106,116 A | 8/2000 | Houston et al. |
| 6,119,279 A | 9/2000 | Haslbeck |
| 6,131,246 A | 10/2000 | Paulson et al. |
| 6,168,271 B1 | 1/2001 | Houston et al. |
| 6,193,367 B1 | 2/2001 | Lee |
| 6,206,519 B1 | 3/2001 | Lin |
| 6,224,209 B1 | 5/2001 | Chen |
| 6,231,179 B1 | 5/2001 | Lee |
| 6,231,181 B1 | 5/2001 | Swab |
| 6,233,342 B1 | 5/2001 | Fernandez |
| 6,244,705 B1 | 6/2001 | Ledbetter et al. |
| 6,250,756 B1 | 6/2001 | Jannard |
| 6,260,964 B1 | 7/2001 | Kroman |
| 6,273,564 B1 | 8/2001 | Wedeck et al. |

(56) References Cited

U.S. PATENT DOCUMENTS

| | | |
|---|---|---|
| 6,276,794 B1 | 8/2001 | Chiang |
| 6,282,727 B1 | 9/2001 | Lindahl |
| 6,290,354 B1 | 9/2001 | Safran |
| 6,296,357 B1 | 10/2001 | Bof |
| D452,522 S | 12/2001 | Chiou |
| 6,349,422 B1 | 2/2002 | Schleger et al. |
| 6,357,873 B1 | 3/2002 | Spindelbalker |
| 6,375,321 B1 | 4/2002 | Lee et al. |
| 6,386,703 B1 | 5/2002 | Huang |
| 6,386,704 B1 | 5/2002 | Wu |
| 6,428,165 B1 | 8/2002 | Rivera |
| 6,464,353 B1 | 10/2002 | Spindelbalker |
| 6,474,812 B1 | 11/2002 | Moon |
| 6,477,717 B1 | 11/2002 | Winefordner et al. |
| 6,502,937 B2 | 1/2003 | Yang |
| 6,533,412 B1 | 3/2003 | Wang et al. |
| 6,540,351 B1 | 4/2003 | Meiler |
| 6,543,895 B2 * | 4/2003 | Fukai .................. G02C 3/04 24/3.11 |
| 6,550,912 B2 | 4/2003 | Vitaloni |
| 6,550,914 B1 | 4/2003 | Kopfer |
| 6,561,647 B1 | 5/2003 | Chen |
| 6,564,804 B2 | 5/2003 | Salatka et al. |
| 6,575,570 B2 | 6/2003 | Mauri |
| 6,637,877 B1 | 10/2003 | Hartley et al. |
| 6,641,263 B2 | 11/2003 | Olney |
| D485,570 S | 1/2004 | Teng |
| 6,702,439 B1 | 3/2004 | Lee |
| 6,712,465 B1 | 3/2004 | Teng |
| 6,715,157 B2 | 4/2004 | Mage |
| 6,718,561 B2 | 4/2004 | Dondero |
| 6,732,383 B2 | 5/2004 | Cleary et al. |
| 6,742,890 B1 | 6/2004 | Teng |
| 6,742,891 B2 | 6/2004 | Chen |
| 6,749,299 B1 | 6/2004 | Hsu |
| 6,783,235 B1 | 8/2004 | Lin |
| 6,786,592 B2 | 9/2004 | Rivera |
| 6,793,336 B2 | 9/2004 | Min |
| 6,804,835 B2 | 10/2004 | Chou |
| 6,817,709 B2 | 11/2004 | Min |
| 6,834,951 B2 | 12/2004 | Xie |
| 6,854,845 B1 * | 2/2005 | Goldman .............. G02C 11/00 351/112 |
| 6,857,738 B1 | 2/2005 | Bove et al. |
| 6,863,394 B1 | 3/2005 | Nelson et al. |
| 6,863,395 B1 | 3/2005 | Teng |
| 6,877,169 B2 | 4/2005 | Acquaviva |
| 6,908,193 B2 | 6/2005 | Cyr |
| D508,255 S | 8/2005 | Wu |
| 6,923,537 B2 | 8/2005 | Hartley et al. |
| 6,926,403 B1 | 8/2005 | Yi et al. |
| 6,926,404 B2 | 8/2005 | Bassahon et al. |
| 6,928,663 B1 | 8/2005 | Tappeiner |
| 6,929,364 B1 | 8/2005 | Jannard |
| 6,938,277 B2 | 9/2005 | Lindahl |
| 6,942,338 B2 | 9/2005 | Ku |
| 6,948,813 B2 | 9/2005 | Parks |
| 6,953,247 B1 | 10/2005 | Duffy et al. |
| D511,540 S | 11/2005 | Hsu |
| 6,959,988 B1 | 11/2005 | Sheldon |
| 6,964,067 B1 | 11/2005 | Hartman |
| 6,964,477 B1 | 11/2005 | Teng |
| 6,969,170 B1 | 11/2005 | Smith |
| 6,969,171 B2 | 11/2005 | Lane et al. |
| D513,033 S | 12/2005 | Hsu |
| 6,994,434 B2 | 2/2006 | Blanchette et al. |
| 7,000,263 B2 | 2/2006 | McNeal |
| 7,003,802 B2 | 2/2006 | Broersma |
| 7,029,114 B2 | 4/2006 | Smith |
| 7,036,152 B2 | 5/2006 | Gafforio et al. |
| 7,036,927 B2 | 5/2006 | Kopfer |
| 7,039,959 B2 | 5/2006 | Dondero |
| 7,058,991 B2 | 6/2006 | Hartman |
| 7,083,276 B2 | 8/2006 | Olney |
| 7,090,346 B2 | 8/2006 | Tsai |
| 7,091,634 B2 | 8/2006 | Yi et al. |
| 7,100,215 B2 | 9/2006 | Shiue |
| 7,137,426 B2 | 11/2006 | Neri et al. |
| 7,137,700 B2 | 11/2006 | DiChiara et al. |
| 7,150,525 B1 | 12/2006 | Yang |
| 7,163,289 B2 | 1/2007 | Wedeck et al. |
| D537,097 S | 2/2007 | Freeman |
| D537,860 S | 3/2007 | Freeman |
| 7,192,134 B2 | 3/2007 | Teng |
| 7,200,875 B2 | 4/2007 | Dondero |
| 7,204,589 B2 | 4/2007 | Pieterman |
| 7,219,992 B1 | 5/2007 | Wu |
| 7,219,993 B1 | 5/2007 | Chiou |
| 7,222,958 B1 | 5/2007 | Chiou |
| 7,222,959 B2 | 5/2007 | Jannard |
| 7,234,808 B2 | 6/2007 | Bruck |
| 7,237,891 B2 | 7/2007 | Min |
| 7,241,007 B2 | 7/2007 | Cody |
| 7,244,022 B2 | 7/2007 | Lee |
| 7,261,410 B1 | 8/2007 | Chen |
| 7,267,434 B2 | 9/2007 | Lane et al. |
| 7,267,737 B2 | 9/2007 | Neri et al. |
| 7,278,733 B2 | 10/2007 | Olney |
| 7,296,887 B1 | 11/2007 | Hsiung |
| 7,328,999 B2 | 2/2008 | Zelman |
| 7,343,631 B2 | 3/2008 | Lin |
| 7,347,545 B1 | 3/2008 | Jannard et al. |
| 7,364,287 B2 | 4/2008 | Lee et al. |
| 7,370,961 B2 | 5/2008 | Lerner et al. |
| 7,384,141 B2 | 6/2008 | Zelman |
| 7,390,086 B2 | 6/2008 | Lee |
| 7,396,124 B1 | 7/2008 | Wang |
| 7,407,281 B2 | 8/2008 | Tagawa |
| 7,425,065 B2 | 9/2008 | Wang |
| 7,431,453 B2 | 10/2008 | Hogan |
| 7,434,929 B2 | 10/2008 | Jackson |
| 7,441,889 B2 | 10/2008 | Zelman |
| 7,452,068 B2 | 11/2008 | Collier et al. |
| 7,452,069 B2 | 11/2008 | Lipawsky |
| 7,478,906 B2 | 1/2009 | Fielding |
| 7,481,529 B1 | 1/2009 | Chen |
| 7,497,569 B2 | 3/2009 | Webb |
| 7,520,217 B2 | 4/2009 | Roberts et al. |
| 7,520,604 B2 | 4/2009 | Choi |
| 7,520,605 B1 | 4/2009 | Chen |
| 7,526,813 B2 | 5/2009 | Tominaga et al. |
| 7,553,013 B2 | 6/2009 | Tsai |
| 7,556,373 B2 | 7/2009 | VanAtta et al. |
| 7,563,341 B2 | 7/2009 | Ferguson et al. |
| 7,585,072 B1 | 9/2009 | Wang-Lee |
| 7,585,073 B2 | 9/2009 | Paolino |
| 7,594,280 B2 | 9/2009 | Lindahl |
| 7,594,723 B2 | 9/2009 | Jannard et al. |
| 7,604,346 B2 | 10/2009 | Wang |
| 7,648,233 B2 | 1/2010 | Blanshay et al. |
| 7,658,492 B2 | 2/2010 | Siu |
| 7,681,257 B1 | 3/2010 | Broersma |
| 7,686,449 B2 | 3/2010 | Jannard et al. |
| 7,703,913 B2 | 4/2010 | Huang |
| D615,580 S | 5/2010 | Baden et al. |
| D616,485 S | 5/2010 | Thixton |
| 7,712,894 B2 | 5/2010 | Tsai |
| 7,712,896 B1 | 5/2010 | Lee |
| 7,725,959 B2 | 6/2010 | Wang-Lee |
| D622,303 S | 8/2010 | Thixton |
| D622,304 S | 8/2010 | Baden et al. |
| 7,771,043 B2 | 8/2010 | Welchel et al. |
| 7,780,810 B2 | 8/2010 | Hamano |
| 7,810,174 B2 | 10/2010 | Matera |
| D629,035 S | 12/2010 | Moritz |
| 7,850,301 B2 | 12/2010 | DiChiara |
| 7,856,673 B2 | 12/2010 | Reed |
| 7,887,181 B1 | 2/2011 | Chen |
| 7,908,668 B2 | 3/2011 | Folkesson |
| D639,845 S | 6/2011 | Fuchs |
| D640,725 S | 6/2011 | Moritz et al. |
| D640,727 S | 6/2011 | Moritz et al. |
| 7,954,942 B2 | 6/2011 | Calilung et al. |
| D646,708 S | 10/2011 | Baden et al. |

(56) References Cited

U.S. PATENT DOCUMENTS

| | | |
|---|---|---|
| 8,028,350 B2 | 10/2011 | Hogen |
| D649,178 S | 11/2011 | Moritz |
| D653,697 S | 2/2012 | Taylor |
| D653,698 S | 2/2012 | Taylor |
| D659,180 S | 5/2012 | Moritz |
| 8,192,015 B2 | 6/2012 | Taylor et al. |
| 8,235,523 B2 | 8/2012 | Yang |
| 8,303,109 B2 | 11/2012 | Matera |
| 8,307,466 B2 | 11/2012 | Hsu |
| 8,316,470 B2 | 11/2012 | McNeal et al. |
| D675,666 S | 2/2013 | Thixton et al. |
| 8,408,695 B2 | 4/2013 | Calilung et al. |
| 8,414,119 B2 | 4/2013 | Yeh |
| 8,424,474 B2 | 4/2013 | Berns |
| 8,469,510 B2 | 6/2013 | Belbey et al. |
| 8,534,830 B2 | 9/2013 | Taylor et al. |
| 8,661,562 B2 | 3/2014 | Calilung et al. |
| 8,668,330 B2 | 3/2014 | Reyes et al. |
| 8,746,877 B2 | 6/2014 | Belbey et al. |
| 8,800,067 B2 | 8/2014 | Saylor et al. |
| 8,850,626 B2 | 10/2014 | Reyes et al. |
| 8,881,316 B2 | 11/2014 | Reyes et al. |
| 8,911,076 B2 | 12/2014 | Calilung et al. |
| 9,122,078 B2 | 9/2015 | Calilung et al. |
| 9,188,792 B2 | 11/2015 | Calilung et al. |
| 9,192,520 B2 | 11/2015 | Cater et al. |
| 9,241,833 B2 | 1/2016 | Cater et al. |
| 9,463,117 B2 | 10/2016 | Belbey et al. |
| 2002/0039928 A1 | 4/2002 | Spurgeon et al. |
| 2003/0048405 A1 | 3/2003 | Rivera |
| 2003/0067584 A1 | 4/2003 | Mauri |
| 2003/0188376 A1 | 10/2003 | Dondero |
| 2004/0025232 A1 | 2/2004 | Hartley et al. |
| 2004/0083540 A1 | 5/2004 | Dondero |
| 2004/0139532 A1 | 7/2004 | Parks |
| 2004/0141146 A1 | 7/2004 | Blanchette et al. |
| 2004/0141147 A1 | 7/2004 | Cyr |
| 2004/0160570 A1 | 8/2004 | Polovin |
| 2005/0070434 A1 | 3/2005 | Drake |
| 2005/0105041 A1 | 5/2005 | Lerner et al. |
| 2005/0132478 A1 | 6/2005 | Canavan |
| 2005/0160521 A1 | 7/2005 | Hussey |
| 2005/0270477 A1 | 12/2005 | Curci et al. |
| 2005/0286013 A1 | 12/2005 | Aylor |
| 2006/0048289 A1 | 3/2006 | Shiue |
| 2006/0119790 A1 | 6/2006 | Tsai |
| 2006/0179554 A1 | 8/2006 | Barton |
| 2006/0191062 A1 | 8/2006 | Matera |
| 2006/0238700 A1 | 10/2006 | Del Vecchio |
| 2006/0250571 A1 | 11/2006 | Li |
| 2006/0256281 A1 | 11/2006 | Li |
| 2006/0283555 A1 | 12/2006 | Green |
| 2007/0006425 A1* | 1/2007 | Woodbury .......... A45C 11/04 24/3.3 |
| 2007/0024806 A1 | 2/2007 | Blanshay |
| 2007/0033718 A1 | 2/2007 | Lin |
| 2007/0091253 A1 | 4/2007 | Chao |
| 2007/0109490 A1 | 5/2007 | Collier et al. |
| 2007/0121059 A1 | 5/2007 | Chiou |
| 2007/0153230 A1 | 7/2007 | Musal et al. |
| 2007/0182916 A1 | 8/2007 | Blanshay et al. |
| 2007/0240812 A1 | 10/2007 | Bortolato |
| 2007/0261782 A1 | 11/2007 | Frye et al. |
| 2008/0036961 A1 | 2/2008 | Zhou |
| 2008/0072365 A1 | 3/2008 | Alberto |
| 2008/0094567 A1 | 4/2008 | Choi |
| 2008/0137028 A1 | 6/2008 | Webb |
| 2008/0155736 A1 | 7/2008 | Paulson et al. |
| 2008/0198323 A1 | 8/2008 | Siu |
| 2008/0266515 A1 | 10/2008 | Hou |
| 2008/0301858 A1 | 12/2008 | Wang-Lee |
| 2008/0304005 A1 | 12/2008 | DiChiara |
| 2009/0007388 A1 | 1/2009 | Villeneuva |
| 2009/0015784 A1 | 1/2009 | Van Atta |
| 2009/0019620 A1 | 1/2009 | Reed |
| 2009/0038057 A1 | 2/2009 | Tews |
| 2009/0038059 A1 | 2/2009 | McNeal et al. |
| 2009/0044317 A1 | 2/2009 | Tews |
| 2009/0066906 A1 | 3/2009 | Huang |
| 2009/0079931 A1 | 3/2009 | Yang |
| 2009/0122254 A1 | 5/2009 | Van Der Heijde et al. |
| 2009/0151037 A1 | 6/2009 | Hsu |
| 2009/0217444 A1 | 9/2009 | Pan |
| 2009/0225271 A1 | 9/2009 | Radmard et al. |
| 2009/0300830 A1 | 12/2009 | Mage |
| 2009/0313746 A1 | 12/2009 | Wang |
| 2009/0323015 A1 | 12/2009 | Siu |
| 2010/0186153 A1 | 7/2010 | Reyes et al. |
| 2010/0201937 A1 | 8/2010 | Gardaz |
| 2010/0231850 A1 | 9/2010 | Hones |
| 2011/0170049 A1 | 7/2011 | Chen |
| 2011/0194065 A1 | 8/2011 | Belbey et al. |
| 2011/0242479 A1 | 10/2011 | Radmard et al. |
| 2011/0258758 A1 | 10/2011 | Renaud-Goud et al. |
| 2011/0279771 A1 | 11/2011 | Chen |
| 2012/0127421 A1 | 5/2012 | Li |
| 2012/0255104 A1 | 10/2012 | Didier |
| 2012/0257159 A1 | 10/2012 | Silver |
| 2013/0019374 A1 | 1/2013 | Schwartz |
| 2013/0083285 A1 | 4/2013 | McNeal et al. |
| 2013/0104300 A1 | 5/2013 | Park |
| 2014/0059747 A1 | 3/2014 | Belbey et al. |
| 2014/0063437 A1 | 3/2014 | Cater et al. |
| 2014/0063438 A1 | 3/2014 | Cater et al. |
| 2014/0078460 A1 | 3/2014 | Chang et al. |
| 2016/0216533 A1 | 7/2016 | Calilung et al. |

FOREIGN PATENT DOCUMENTS

| | | | |
|---|---|---|---|
| EP | 0 496 292 | 1/1991 | |
| EP | 0 495 767 | 7/1992 | |
| EP | 0 702 803 | 3/1996 | |
| EP | 1382989 | 1/2004 | |
| EP | 1428061 | 6/2004 | |
| EP | 1 810 648 | 7/2007 | |
| EP | 1 830 221 | 9/2007 | |
| EP | 2 042 910 | 4/2009 | |
| EP | 2 090 921 | 8/2009 | |
| FR | 1126329 | 11/1956 | |
| FR | 2088866 | 1/1972 | |
| FR | 2626682 | 8/1989 | |
| FR | 2 684 292 | 6/1993 | |
| FR | 2800173 | 4/2001 | |
| GB | 468443 | 7/1937 | |
| GB | 512419 | 9/1939 | |
| GB | 2055222 | 2/1981 | |
| GB | 2181859 | 4/1987 | |
| GB | 2199155 | 6/1988 | |
| GB | 2278459 | 11/1994 | |
| JP | 62-3774 Y2 | 7/1926 | |
| JP | 56-126611 | 2/1955 | |
| JP | 56-066915 | 6/1981 | |
| JP | 57-176119 | 11/1982 | |
| JP | 59-79827 | 5/1984 | |
| JP | 59-104127 | 6/1984 | |
| JP | 60-094624 | 6/1985 | |
| JP | 60-146218 | 8/1985 | |
| JP | 60-143420 | 9/1985 | |
| JP | 61-160422 | 10/1986 | |
| JP | 219021 | 2/1990 | |
| JP | 02-240360 | 9/1990 | |
| JP | 07-032628 | 2/1995 | |
| JP | 07-64028 | 3/1995 | |
| JP | 07-140423 | 6/1995 | |
| JP | 7-234385 | * 9/1995 | .......... G02C 11/00 |
| JP | 3021121 U | 2/1996 | |
| JP | 08-062544 | 3/1996 | |
| JP | 10-239642 | 9/1998 | |
| JP | 2002-228986 | 8/2002 | |
| JP | 2003-536093 | 12/2003 | |
| JP | 2005-067551 | 3/2005 | |
| JP | 2009-139921 | 6/2009 | |
| JP | 2010-224130 | 10/2010 | |
| JP | 2012-509497 | 4/2012 | |

(56) References Cited

FOREIGN PATENT DOCUMENTS

| | | |
|---|---|---|
| KR | 10-2014-0027745 | 3/2014 |
| WO | WO 94/29763 | 12/1994 |
| WO | WO 97/21135 | 6/1997 |
| WO | WO 97/41815 | 11/1997 |
| WO | WO 98/30930 | 7/1998 |
| WO | WO 99/64918 | 12/1999 |
| WO | WO 03/023495 | 3/2003 |
| WO | WO 2005/119343 | 12/2005 |
| WO | WO 2007/049070 | 5/2007 |
| WO | WO 2008/042008 | 4/2008 |
| WO | WO 2008/125743 | 10/2008 |
| WO | WO 2010/003143 | 1/2010 |
| WO | WO 2010/021419 | 2/2010 |
| WO | WO 2010/081043 | 7/2010 |
| WO | WO 2011/116343 | 9/2011 |
| WO | WO 2011/117909 | 9/2011 |
| WO | WO 2012/021863 | 2/2012 |
| WO | WO 2013/044146 | 3/2013 |
| WO | WO 2013/082495 | 6/2013 |
| WO | WO 2013/154582 | 10/2013 |
| WO | WO 2014/124352 | 8/2014 |
| WO | WO 2015/148770 | 10/2015 |

* cited by examiner

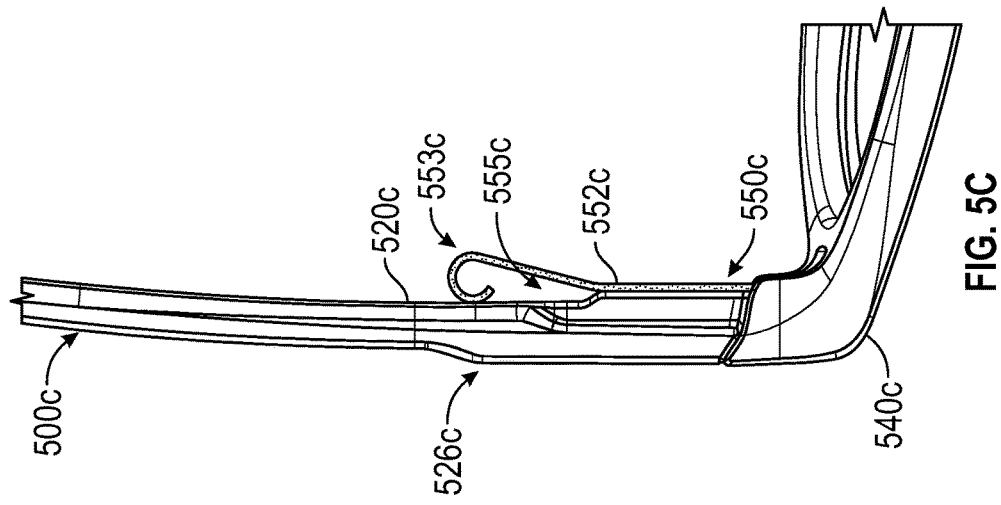
FIG. 5C
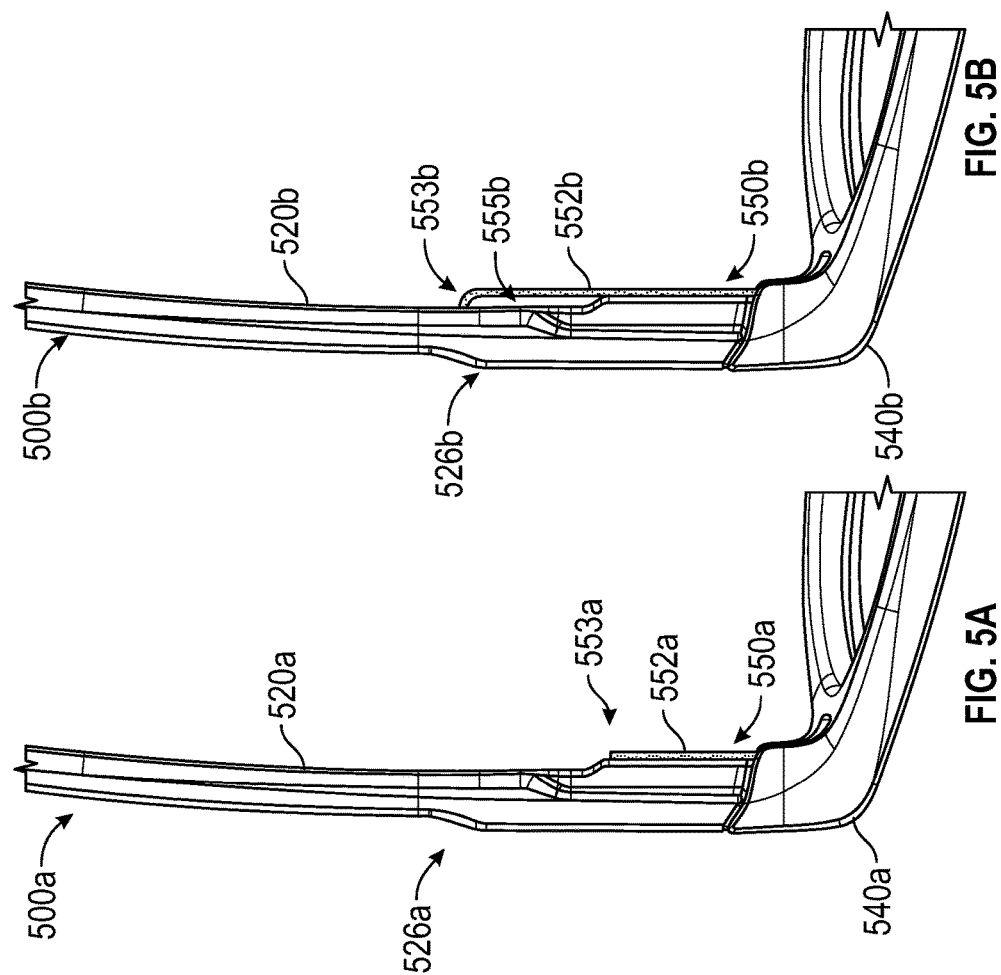
FIG. 5B
FIG. 5A

EYEWEAR RETENTION DEVICES AND METHODS

BACKGROUND

Field

The embodiments described herein relate generally to retention devices and methods for eyewear. In particular, some embodiments described herein relate to passive and actively-actuated retention devices and methods for retaining an eyewear on another object.

Background

There are numerous situations in which it is convenient and preferable to hold or retain eyewear to another object, such as in or on a user's apparel. For example, a user may temporarily store the eyewear in a shirt pocket. However, this method of holding or retaining the eyewear may be risky while a user is engaged in an activity in which a user may be subject to quick directional changes such as, but not limited to, up-and-down motion while walking or running, and lateral directional changes when shifting side-to-side, or in situations in which the user may be subject to substantial environmental forces such as, but not limited to, gusts of wind or the like. Such activity and/or forces may cause an eyewear positioned on or in the user's apparel to move and become removed from or detached from the user's apparel.

SUMMARY

Accordingly, there is a need for retention devices and methods for eyewear. In some embodiments, an eyewear can include a support which can be configured to be carried on a head of a user. The support can include a face configured to support one or more lenses. The support can also include an earstem rotatably coupled to the face at or proximate an anterior end of the earstem, the earstem having an anterior portion positioned closer to the anterior end than to a posterior end. The eyewear can include a retention system coupled to the support. The retention system can include a retention member having a free end. The retention member can be configured to retain an object separate from the eyewear between the support and the retention member.

In some embodiments, the retention member can be formed from a resiliently deflectable material. At least the free end can be configured to impart a clamping force on the object positioned therebetween. In some embodiments, the retention member can be coupled to the anterior portion of the earstem. The retention member can be configured to retain the object between the earstem and the retention member. In some embodiments, at least a portion of the retention member can be spaced apart from the earstem. In some embodiments, at least a portion of the retention member at or proximate the free end can be curved or angled towards the earstem. In some embodiments, at least a portion of the retention member at or proximate the free end can be curved or angled away from the earstem. In some embodiments, the retention member can extend along an inner side of the earstem.

In some embodiments, the retention system can include an actuation member. The actuation member can be configured to increase a distance between the free end of the retention member and the support to facilitate positioning of an object therebetween. In some embodiments, the actuation member can include a projection. The projection can be configured to contact a portion of the retention member when the earstem is pivoted relative to the face. In some embodiments, the earstem can be configured to rotate between an open position and a closed position. In some embodiments, the projection is positioned relative to the support and the retention member such that the distance between the free end of the retention member and the support can be greater when the earstem is in an intermediate position than when in at least one of the open position and the closed position, the intermediate position being between the open position and the closed position. In some embodiments, the projection can be positioned relative to the support and the retention mechanism such that the distance between the free end of the retention member and the support can be greater when the earstem is in an intermediate position than when in the open position and the closed position. In some embodiments, the actuation member can include a user-operable switch.

In some embodiments, the retention system can be configured to form at least part of the coupling between the face and the earstem. In some embodiments, the earstem can be configured to rotate between an open position and a closed position. The retention system can be configured to bias the earstem away from an intermediate position towards the open position or the closed position.

In some embodiments, the eyewear can include at least one lens, wherein the at least one lens can be coupled to the support.

In some embodiments, the eyewear can include an earstem having an anterior portion positioned closer to an anterior end of the earstem than to a posterior end of the earstem. The eyewear can also include a retention system coupled to the earstem. The retention system can include a retention member having a free end. The retention member can be configured to retain an object separate from the eyewear between the earstem and the retention member.

In some embodiments, the retention member can be formed from a resiliently deflectable material. At least the free end can be configured to impart a clamping force on the object positioned therebetween. In some embodiments, at least a portion of the retention member at or proximate the free end can be curved or angled towards the earstem. In some embodiments, the eyewear can include an actuation system configured to increase a distance between the free end of the retention member and the earstem to facilitate positioning of an object therebetween. In some embodiments, the eyewear can include at least one lens, wherein the earstem is rotatably coupled to the lens.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples of embodiments in accordance with the disclosure, and are not to be considered limiting of its scope, the disclosure will be described with additional specificity and detail through the use of the accompanying drawings.

FIGS. 5A-5E illustrate top plan views of embodiments of eyewear having retention systems, the retention systems having retention members with different shapes.

DETAILED DESCRIPTION

Figure 1:
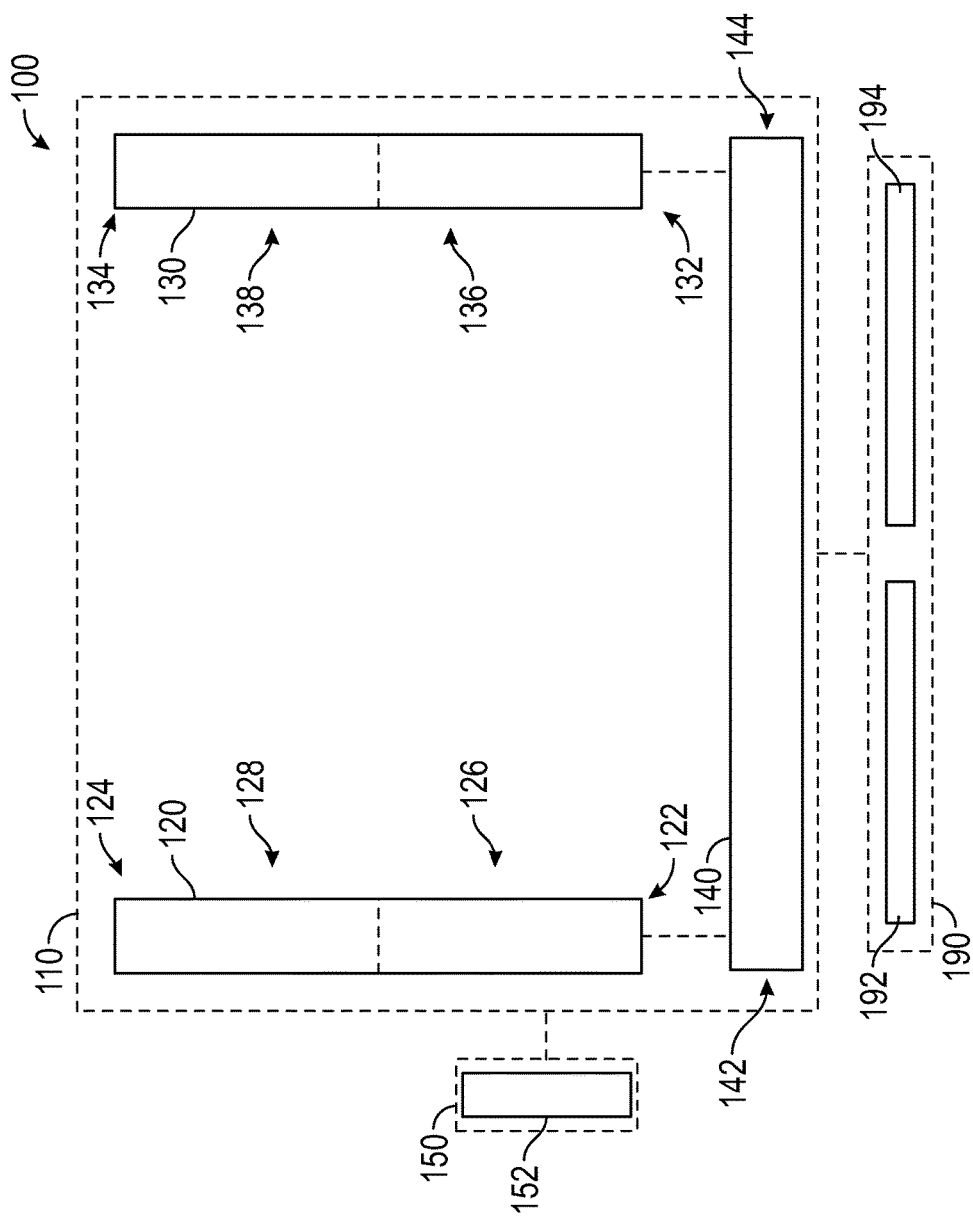
FIG. 1 illustrates a schematic of an embodiment of an eyewear having a retention system.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the proceeding technical field, background, brief summary, or the following detailed description.

The present specification and drawings provide aspects and features of eyewear retention devices and methods, in the context of several embodiments of devices and methods. As used in the present specification and drawings, "eyewear" and "eyeglasses" are general terms intended to be used in accordance with their ordinary meanings. For example, these terms embrace any optical devices, such as those containing corrective lenses for defects in vision or lenses for such special purposes as filters for absorbing or blocking portions of the electromagnetic spectrum, providing physical shields for the eyes or making available other physical or optical functions for protective or visual assisting purposes. These embodiments are described and illustrated in connection with specific types of eyewear such as eyewear having dual lenses. However, it is to be understood that the features and concepts discussed herein, such as the retention systems, can be applied to other types of wearable devices including, but not limited to, eyewear having a single lens or no lens, goggles with or without lenses, outerwear and the like. Moreover, it is also to be understood that although particular embodiments may be disclosed or shown in the context of frames having full orbitals, such embodiments can be used with frames having full or partial orbitals or rimless or faceless frames. In addition, particular features of the devices, systems, and methods should not be taken as limiting, and features of any one embodiment discussed herein can be combined with features of other embodiments as desired and when appropriate. Any feature, step, material, or structure described and/or illustrated in any embodiment can be used with or instead of any other feature, step, material, or structure described and/or illustrated in any other embodiment. Anything in this specification can be omitted in some embodiments; no features described or illustrated in this specification are essential or indispensable.

Certain terminology may be used in the following description for the purpose of reference only, and thus are not intended to be limiting. For example, terms such as "upper", "lower", "inner", "outer", "above", and "below" refer to directions in the drawings to which reference is made. Terms such as "anterior", "posterior", "right", "left", "right side", "left side" describe the orientation and/or location of portions of the component within a consistent but arbitrary support of reference which is made clear by reference to the text and the associated drawings describing the component under discussion. Such terminology may include the words specifically mentioned above, derivatives thereof, and words of similar import. Similarly, the terms "first", "second", "third", and other such numerical terms referring to structures do not imply a sequence or order, or a requirement that all preceding structures be included, unless clearly indicated by the context.

Overview of Eyewear

FIGS. 1-4 are schematic illustrations of various embodiments of eyewear 100, 200, 300, 400. As shown in the illustrated embodiments, the eyewear 100, 200, 300, 400 can include one or more supports 110, 210, 310, 410. In some embodiments, the supports 110, 210, 310, 410 can be configured to be supported on a head of a user or wearer.

As shown in the illustrated embodiments, the eyewear 100, 200, 300, 400 can also include one or more retention systems 150, 250, 260, 350, 450, 460 coupled to or formed on or integrated into the one or more supports 110, 210, 310, 410. In some embodiments, the one or more retention systems 150, 250, 260, 350, 450, 460 can be configured to retain the eyewear 100, 200, 300, 400 on an object separate from the eyewear 100, 200, 300, 400. For example, the one or more retention systems 150, 250, 260, 350, 450, 460 can be configured to retain the eyewear 100, 200, 300, 400 on a user's person such as, but not limited to, on a shirt, a sweater, a jacket, a pair of shorts, a pair of pants, a cap, a handbag, a backpack, a belt, and the like, or on another object, such as on an object in a car or bicycle, such as on a sunvisor or a strap or lanyard or cable. The retention systems 150, 250, 260, 350, 450, 460 can be configured to accommodate for various thicknesses of the objects to which the eyewear 100, 200, 300, 400 is attached. As another example, the one or more retention systems 150, 250, 260, 350, 450, 460 configured to retain the eyewear 100, 200, 300, 400 on an object separate from the user's person such as a vehicle's sunvisor and the like.

As shown in the illustrated embodiments, the eyewear 100, 200, 300, 400 can also include one or more lenses 190, 290, 390, 490.

Embodiment of Passive Retention System on Support of Eyewear

With reference first to FIG. 1, an embodiment of an eyewear 100 is illustrated having a support 110. The support 110 can include a right earstem 120, a left earstem 130, and a face 140. The right earstem 120 can include an anterior end 122, a posterior end 124, an anterior portion 126, and a posterior portion 128. The left earstem 130 can similarly include an anterior end 132, a posterior end 134, an anterior portion 136, and a posterior portion 138. The face 140 can include a right side 142 and a left side 144 and be configured to support a lens 190, such as a right lens 192 and left lens 194. In some embodiments, the face 140 can be configured to surround at least a portion or an entirety of the periphery of the lens 190 such as lenses 192, 194. For example, the face 140 can include partial or full orbitals.

In some embodiments, the earstems, such as right and/or left earstems 120, 130, and/or face 140 can be fabricated using one or more metals, polymers, or other relatively stiff and/or resilient materials that can have desirable lens securing and stabilizing properties while nevertheless enabling the eyewear to provide desirable flexural properties in the earstems, such as right and/or left earstems 120, 130 thereof. For example, in some embodiments, titanium, carbon fiber, plastic, aluminum, and other such materials can be used in the earstems, such as right and/or left earstems 120, 130, and/or face 140 to provide superior mechanical properties while reducing the weight of the support 110. Any suitable metals, plastics or other rigid and/or resilient materials can be used to form the support 110 to provide exceptional rigidity, durability, and wear resistance. Nevertheless, various features and aspects disclosed herein can be used in eyewear fabricated from any material, e.g., plastic, acetate, composite, metal, etc., or any combination thereof. The lens 190, such as a right and/or left lens 192, 194, may take any of a number of configurations and can be formed of sheet plastic, molded plastic, glass, etc., as determined by the application of the lens.

As shown in the illustrated embodiment, the right earstem 120 and the left earstem 130 can be coupled to the face 140. For example, the right earstem 120 can be coupled to the right side 142 of the face 140 at or proximate an anterior end 122 of the right earstem 120 and the left earstem 130 can be coupled to the left side 144 of the face 140 at or proximate an anterior end 132 of the left earstem 130. In some embodiments, the right and/or left earstems 120, 130 can be permanently affixed to the face 144. A permanent attachment of the earstems, such as right and/or left earstems 120, 130, to the face 140 may be accomplished, for example, through molding or thermoplastic bonding. In some embodiments, the right and/or left earstems 120, 130 can be rotatably coupled to the face 144 via a rotatable coupling such as, but not limited to, a snap fit coupling or fasteners including screws or pins or any other rotatable coupling as desired.

In some embodiments where the right and/or left earstems 120, 130 are rotatably coupled to the face 140, the right and/or left earstems 120, 130 can rotate from an open position, in which the eyewear 100 can be worn by a user, to a closed position, in which the eyewear 100 takes on a more compact form factor for storage, and vice versa. In the open position, the right and/or left earstems 120, 130 can form an angle, such as an angle of between approximately 135 degrees to approximately 75 degrees with the face 140, or between approximately 125 degrees to approximately 80 degrees with the face 140, or between approximately 115 degrees to approximately 85 degrees with the face 140, or any sub-range within these ranges, or any other angle as desired. For example, the right and/or left earstems 120, 130 can be generally perpendicular to the face 140 in the open position. In the closed position, the right and/or left earstems 120, 130 can form an angle, such as an angle of between approximately 30 degrees to approximately −10 degrees with the face 140, or between approximately 20 degrees to approximately −5 degrees with the face 140, or between approximately 10 degrees to approximately 0 degrees with the face 140, or any sub-range within these ranges, or any other angle as desired. For example, the right and/or left earstems 120, 130 can be generally parallel to the face 140 in the closed position. In some embodiments, the right and/or left earstems 120, 130 can rotate, such as rotating between approximately 135 degrees to approximately 45 degrees from the closed position to the open position, or between approximately 120 degrees to approximately 60 degrees from the closed position to the open position, or between approximately 105 degrees to approximately 75 degrees from the closed position to the open position, or any sub-range within these ranges, or any other range as desired. For example, the right and/or left earstems 120, 130 can rotate approximately 90 degrees from the closed position to the open position.

With continued reference to the embodiment of eyewear 100 illustrated in FIG. 1, the eyewear 100 can include a retention system 150. As noted above, the retention system 150 can be configured to retain the eyewear 100 on an object separate from the eyewear 100. As shown in the illustrated embodiment, the retention system 150 can include a retention member 152. The retention system 150, such as the retention member 152, can be coupled to a portion of the support 110. For example, the retention system 150 can be coupled to the right earstem 120, the left earstem 130, the face 140, and/or a combination of these components of the support 110.

In some embodiments, the coupling between the retention system 150 and the support 110 can be such that the retention system 150, or components thereof, can be removable from the support 110. For example, the retention system 150 can be coupled to the support 110 using removable fasteners such as threaded screws, threaded bolts, and the like. As another example, the retention system 150 can be coupled to the support 110 using removable fasteners such as a clip. In some embodiments, the retention system 150 can include a retention member 152 which is configured to clip onto or fit over a portion of the support 110 such that the retention system 150 can be removed from the support 110 without using tools such as a screwdriver. In some embodiments, the retention system 150 can be coupled to the portion of the support 110 using one or more permanent affixation methods such as, but not limited to, overmolding, one or more adhesives, and the like. In some embodiments, the retention system 150 can be unitarily formed with the portion of the support 110.

In some embodiments, the retention member 152 can be configured to retain the object, such as by forming a retaining relationship (e.g., with a gripping action, a clamping action, a pinching action, a compressing action, an adhering action, and/or a hooking action, etc.), between the support 110 and the retention member 152. In some embodiments, the retention member 152 can be configured to retain the object to the eyewear by itself (e.g., without forming a retaining relationship between the support 110 and the retention member 152), such as by forming a retaining relationship directly between the retention member 152 and the object. The retention member 152 can be sized and shaped to assist in retaining the eyewear 100 on the object. In some embodiments, the retention member 152 can have a length relative to another component of the eyewear 100 such as the support 110 or lens 190. For example, in some embodiments, the retention member 152 can have a length of between approximately 5% to approximately 60% of a length of an earstem, such as left and/or right earstems 120, 130, a length of between approximately 10% to approximately 50% of a length of an earstem, a length of between approximately 15% to approximately 40% of a length of an earstem, a length of between approximately 20% to approximately 30% of a length of an earstem, any sub-range within these ranges, or any percentage of the length of an earstem as desired, the length being a longitudinal length from an anterior end, such as anterior ends 122, 132, to a posterior end, such as posterior ends 124, 134.

In some embodiments, the retention member 152 can have a free end (see, for example, free ends 553*a-e*, 663, and 753 of FIGS. 5A-E, 8A, 8B, 9A, and 9B respectively) which is movable relative to a portion of the support 110 such that a portion of the object on which the eyewear 100 is to be retained can be passed between the free end and the support 110. To enhance retention between the retention member 152 and the support 110, the retention member 152 can be configured to impart a biasing force to the object positioned between the retention member 152 and the support 110. For example, the retention member 152 can be biased such at least some portion of the free end imparts a biasing force on the object.

In some embodiments, the retention system 150 can be passively actuated via direct interaction between the retention system 150, the support 110, and the object to be positioned therebetween. For example, the retention member 152 can be formed from a resiliently deformable material and a portion of the retention member 152 can be positioned relative to the support 110 such that, when an object is positioned between the retention member 152 and the support 110, the retention member 152 is deformed away from the support 110. Due to the resiliency of the material, the retention member 152 can impart a biasing force on the object to clamp or clip the object between the retention member 152 and the support 110. In some embodiments, the retention member 152 can be formed from metals such as, but not limited to steel, aluminum, and/or titanium, polymers, composites, combinations of such materials, and any other resiliently deformable materials or combination thereof as desired. As another example, the retention system 150 can include a biasing member (not shown) such as, but not limited to, a torsion spring or linear spring. The biasing member can be coupled, translatable, rotatably, or a combination of both, to the retention member 152 such that, when an object is positioned between the retention member 152 and the support 110, the retention member 152 can be translated and/or rotated away from the support 110. The biasing member can be configured to bias the retention member 152 towards the initial position such that, when the retention member 152 is moved away from the support 110, the retention member 152 can impart a biasing force on the object to clamp or clip the object between the retention member 152 and the support 110.

In some embodiments, the retention member 152 can be configured to retain the eyewear 100 on an object without imparting a biasing force on the object. For example, the retention member 152 may not be generally deformable or movable relative to the support 110. The free end of the retention member 152 can be spaced apart from a portion of the support such that an object can be positioned between the retention member 152 and the support 110. The dimensions of the retention system 150, such as the retention member 152, and the positioning of the retention system 150 relative to the support 110 can be chosen to sufficiently retain the eyewear 100 on the object.

Embodiment of Passive Retention System on Earstem of Support

Figure 2:
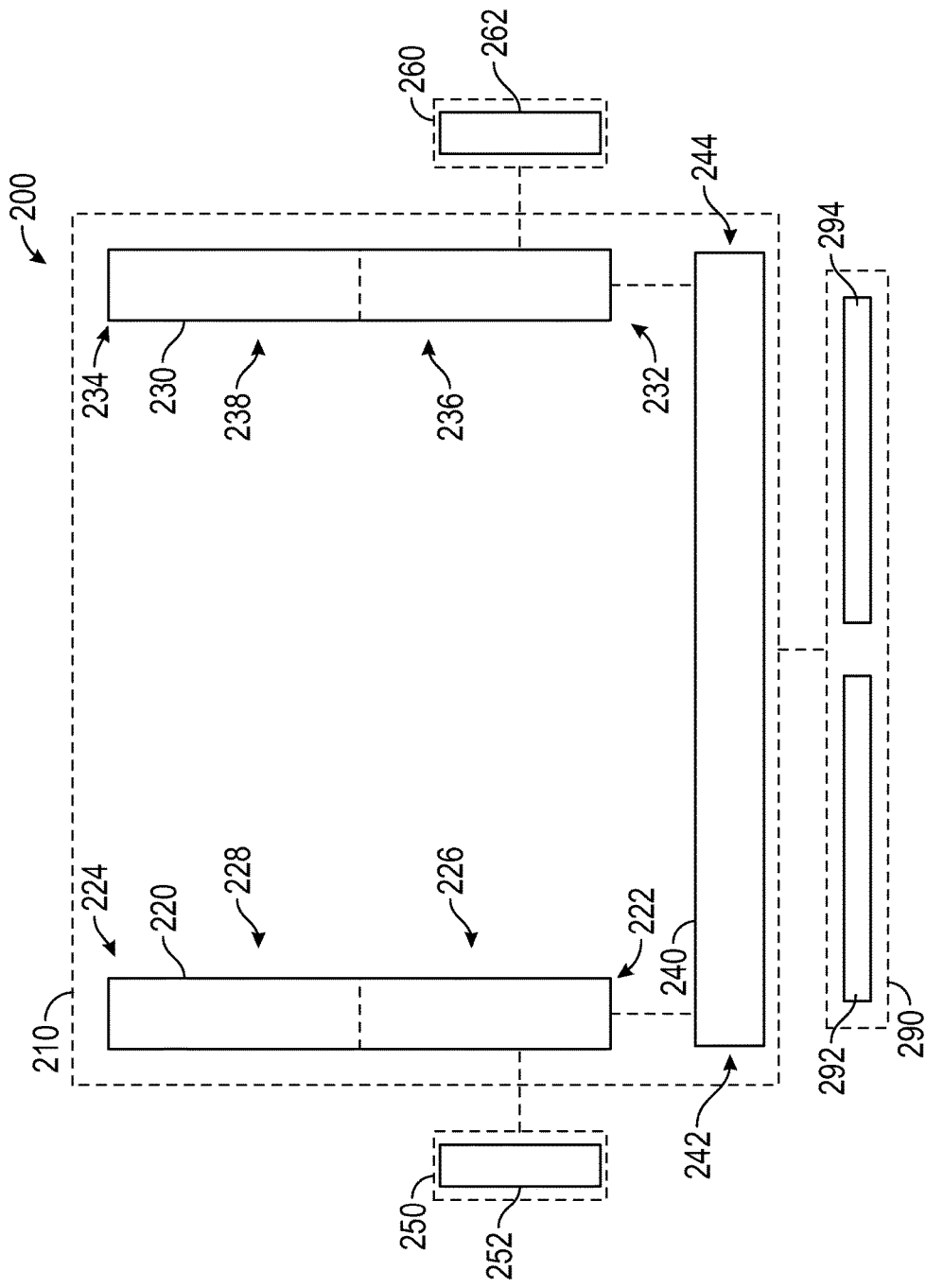
FIG. 2 illustrates a schematic of another embodiment of an eyewear having a retention system, the passive retention system including a retention member coupled to an earstem.

With reference next to FIG. 2, an embodiment of an eyewear 200 is illustrated having a support 210. The eyewear 200 can include or share any or all of the components, features and/or characteristics described above in connection with eyewear 100.

The support 210 can include a right earstem 220, a left earstem 230, and a face 240. Similar to the embodiment of eyewear 100, the right earstem 220 can include an anterior end 222, a posterior end 224, an anterior portion 226, and a posterior portion 228. The left earstem 230 can similarly include an anterior end 232, a posterior end 234, an anterior portion 236, and a posterior portion 238. The face 240 can include a right side 242 and a left side 244 and be configured to support a lens 290, such as a right lens 292 and left lens 294. In some embodiments, the face 240 can be configured to surround at least a portion or an entirety of the periphery of the lens 290, such as lenses 292, 294. For example, the face 240 can include partial or full orbitals.

In some embodiments, the earstems, such as right and/or left earstems 220, 230, and/or face 240 can be fabricated using one or more metals, polymers, or other relatively stiff and/or resilient materials that can have desirable lens securing and stabilizing properties while nevertheless enabling the eyewear to provide desirable flexural properties in the earstems, such as right and/or left earstems 220, 230 thereof. For example, in some embodiments, titanium, carbon fiber, plastic, aluminum, and other such materials can be used in the earstems, such as right and/or left earstems 220, 230, and/or face 240 to provide superior mechanical properties while reducing the weight of the support 210. Any suitable metals, plastics or other rigid and/or resilient materials can be used to form the support 210 to provide exceptional rigidity, durability, and wear resistance. Nevertheless, various features and aspects disclosed herein can be used in eyewear fabricated from any material, e.g., plastic, acetate, composite, metal, etc., or any combination thereof. The lens 290, such as a right and/or left lens 292, 294, may take any of a number of configurations and can be formed of sheet plastic, molded plastic, glass, etc., as determined by the application of the lens.

As shown in the illustrated embodiment, the right earstem 220 and the left earstem 230 can be coupled to the face 240. For example, the right earstem 220 can be coupled to the right side 242 of the face 240 at or proximate an anterior end 222 of the right earstem 220 and the left earstem 230 can be coupled to the left side 244 of the face 240 at or proximate an anterior end 232 of the left earstem 230. In some embodiments, the right and/or left earstems 220, 230 can be permanently affixed to the face 244. A permanent attachment of the earstems, such as right and/or left earstems 220, 230, to the face 240 may be accomplished, for example, through molding or thermoplastic bonding. In some embodiments, the right and/or left earstems 220, 230 can be rotatably coupled to the face 244 via a rotatable coupling such as, but not limited to, a snap fit coupling or fasteners including screws or pins or any other rotatable coupling as desired.

In some embodiments where the right and/or left earstems 220, 230 are rotatably coupled to the face 240, the right and/or left earstems 220, 230 can rotate from an open position, in which the eyewear 200 can be worn by a user, to a closed position, in which the eyewear 200 takes on a more compact form factor for storage, and vice versa. In the open position, the right and/or left earstems 220, 230 can form an angle, such as an angle of between approximately 135 degrees to approximately 75 degrees with the face 240, or between approximately 125 degrees to approximately 80 degrees with the face 240, or between approximately 115 degrees to approximately 85 degrees with the face 240, or any sub-range within these ranges, or any other angle as desired. For example, the right and/or left earstems 220, 230 can be generally perpendicular to the face 240 in the open position. In the closed position, the right and/or left earstems 220, 230 can form an angle, such as an angle of between approximately 30 degrees to approximately −10 degrees with the face 240, or between approximately 20 degrees to approximately −5 degrees with the face 240, or between approximately 10 degrees to approximately 0 degrees with the face 240, or any sub-range within these ranges, or any other angle as desired. For example, the right and/or left earstems 220, 230 can be generally parallel to the face 240 in the closed position. In some embodiments, the right and/or left earstems 220, 230 can rotate, such as rotating between approximately 135 degrees to approximately 45 degrees from the closed position to the open position, or between approximately 120 degrees to approximately 60 degrees from the closed position to the open position, or between approximately 105 degrees to approximately 75 degrees from the closed position to the open position, or any sub-range within these ranges, or any other range as desired. For example, the right and/or left earstems 220, 230 can rotate approximately 90 degrees from the closed position to the open position.

With continued reference to the embodiment of eyewear 200 illustrated in FIG. 2, the eyewear 200 can include a first retention system 250 and/or a second retention 260. As noted above, the retention systems 250, 260 can be configured to retain the eyewear 200 on an object separate from the eyewear 200. In some embodiments, a fewer or greater number of retention systems can be used.

As shown in the illustrated embodiment, the first retention system 250 can include a retention member 252. The second retention system 260 can include a retention member 262. The first retention system 250 can be coupled to the right earstem 220. The second retention system 260 can be coupled to the left earstem 230. In some embodiments, the first retention system 250 and/or second retention system 260 can be coupled to other portions of the support 210. For example, the first retention system 250 can be coupled to one earstem, such as the right or left earstems 220, 230 and the second retention system 250 can be coupled to the face 240. As another example, the first retention system 250 and the second retention system 260 can be coupled to the same component of the support 220, such as the right or left earstems 220, 230. In some cases in which the first retention system 250 and the second retention system 260 are attached to the same component, the first retention system 250 and the second retention system 260 can be attached to different portions and/or surfaces of the component.

For purposes of brevity, features and characteristics of the first retention system 250 will be described in greater detail below. The second retention system 260 can include or share any or all of the components, features, and/or characteristics of the first retention system 250 described below. In embodiments where the second retention system 260 is coupled to the left earstem 260, the description below of the first retention system 250 can be applied to the second retention system 260 with respect to the left earstem 260. Any component, feature, and/or characteristic that is illustrated and/or described in this specification with respect to either earstem can be used on the other earstem and/or on any other structure of an eyewear.

As shown in the illustrated embodiment, the first retention system 250 can be coupled to the anterior portion 226 of the right earstem 220. The anterior portion 226 can extend from the anterior end 222 of the right earstem 220 towards the posterior end 224 of the earstem. As shown in the illustrated embodiment, the posterior portion 228 can extend from the anterior portion 226 and extend to the posterior end 224 of the right earstem 220.

In some embodiments, the coupling between the first retention system 250 and the right earstem 220 can be accomplished such that the first retention system 250, or components thereof, can be removable from the right earstem 220. For example, the first retention system 250 can be coupled to the right earstem 220 using removable fasteners such as threaded screws, threaded bolts, and the like. As another example, the first retention system 250 can be coupled to the right earstem 220 using removable fasteners such as a clip. In some embodiments, the first retention system 250 can include a retention member 252 which is configured to clip onto or fit over a portion of the right earstem 220 such that the first retention system 250 can be removed from the right earstem 220 without using tools such as a screwdriver. In some embodiments, the first retention system 250 can be coupled to the right earstem 220 using one or more permanent affixation methods such as, but not limited to, overmolding, one or more adhesives, and the like. In some embodiments, the first retention system 250 can be unitarily formed with the right earstem 220.

In some embodiments, the first retention system 250 can be coupled to the right earstem 220 at any position along a portion of the right earstem 220. In some embodiments, this portion can extend from the anterior end 222 of the right earstem 220 and extend along a length of at least approximately 70% of the length of the right earstem 220 towards the posterior end 224, a length of at least approximately 60% of the length of the right earstem 220 towards the posterior end 224, a length of at least approximately 50% of the length of the right earstem 220 towards the posterior end 224, a length of at least approximately 40% of the length of the right earstem 220 towards the posterior end 224, a length of at least approximately 30% of the length of the right earstem 220 towards the posterior end 224, any other lengths within the stated lengths, and any other lengths as desired, the length being a longitudinal length from the anterior end 222 to the posterior end 224. In some embodiments, this portion can extend from the posterior end 224 and extend along a length of the right earstem 220 towards the anterior end 222. The length of this portion can be similar to the length of the portion described above which extends from the anterior end 222.

With continued reference to the embodiment of eyewear 200 illustrated in FIG. 2, the retention member 252 can extend along a side of either or both of the earstems, such as along a side of the right earstem 220. For example, the retention member 252 can extend along an inner side of the right earstem 220, the inner side facing the user of the eyewear 200 when worn by the wearer. As another example, the retention member 252 can extend along an outer side of the right earstem 220, the outer side facing away from the user of the eyewear 200 when worn by the wearer. The retention member 252 can extend along other sides of right earstem 220 such as the upper side and/or lower side of the right earstem 220. In some embodiments, the retention member 252 can extend along multiple sides of the right earstem 220. For example, the retention member 252 can extend along both the inner side and the outer side.

In some embodiments, the retention member 252 can be configured to retain the object, such as by forming a retaining relationship (e.g., with a gripping action, a clamping action, a pinching action, a compressing action, an adhering action, and/or a hooking action, etc.), between the support 210 and the retention member 252. In some embodiments, the retention member 252 can be configured to retain the object to the eyewear by itself (e.g., without forming a retaining relationship between the support 210 and the retention member 252), such as by forming a retaining relationship directly between the retention member 252 and the object. The retention member 252 can be sized and shaped to retain the eyewear 200 on the object. In some embodiments, the retention member 252 can extend in a direction which is generally parallel or aligned with a longitudinal axis of the right earstem 220. In some embodiments, the retention member 152 can extend along a side, such as the inner side, of the right earstem 220 and have a length of between approximately 5% to approximately 60% of the length of the right earstem 220, a length of between approximately 10% to approximately 50% of the length of the right earstem 220, a length of between approximately 15% to approximately 40% of a length of the right earstem 220, a length of between approximately 20% to approximately 30% of a length of the right earstem 200, any sub-range within these ranges, or any percentage of the length of the right earstem 200 as desired. In embodiments where the retention member 252 extends along multiple sides, the retention member 252 can extend along each side with length similar to that described above. The lengths along different sides can be different. For example, the portion of the retention member 252 extending along the inner side of the right earstem 220 can have a length greater than a portion of the retention member 252 extending along the outer side of the right earstem 220, or vice versa.

The retention member 252 can be configured to retain the object between the support 210 and the retention member 252. In some embodiments, the retention member 252 can have a free end (see, for example, free ends 553a-e, 663, and 753 of FIGS. 5A-E, 8A, 8B, 9A, and 9B respectively) which is movable relative to a portion of the support 210 such that a portion of the object on which the eyewear 200 is to be retained can be passed between the free end and the support 210. To enhance retention between the retention member 252 and the support 210, the retention member 252 can be configured to impart a biasing force to the object positioned between the retention member 252 and the support 210. For example, the retention member 252 can be biased such at least some portion of the free end imparts a biasing force on the object.

In some embodiments, the first retention system 250 can be passively actuated via direct interaction between the first retention system 250, the support 210, and the object to be positioned therebetween. For example, the retention member 252 can be formed from a resiliently deformable material and a portion of the retention member 252 can be positioned relative to the support 210 such that, when an object is positioned between the retention member 252 and the support 210, the retention member 252 is deformed away from the support 210. Due to the resiliency of the material, the retention member 252 can impart a biasing force on the object to clamp or clip the object between the retention member 252 and the support 210. In some embodiments, the retention member 252 can be formed from metals such as, but not limited to steel, aluminum, and/or titanium, polymers, composites, combinations of such materials, and any other resiliently deformable materials or combination thereof as desired. As another example, the first retention system 250 can include a biasing member (not shown) such as, but not limited to, a torsion spring or linear spring. The biasing member can be coupled, translatable, rotatably, or a combination of both, to the retention member 252 such that, when an object is positioned between the retention member 252 and the support 210, the retention member 252 can be translated and/or rotated away from the support 210. The biasing member can be configured to bias the retention member 252 towards the initial position such that, when the retention member 252 is moved away from the support 210, the retention member 252 can impart a biasing force on the object to clamp or clip the object between the retention member 252 and the support 210.

In some embodiments, the retention member 252 may not be passively actuated. For example, the retention member 252 may not be generally deformable or movable relative to the support 210. The free end of the retention member 252 can be spaced apart from a portion of the support such that an object can be positioned between the retention member 252 and the support 210. The dimensions of the retention system 250, such as the retention member 252, and the positioning of the first retention system 250 relative to the support 210 can be chosen to sufficiently retain the eyewear 200 on the object.

As noted above, the second retention system 260 can share similar features and/or characteristics of the first retention system 250. In some embodiments, the first retention system 250 and the second retention system 260 can include or share any or all of the same components, features, and/or characteristics. In some embodiments, the first retention system 250 and the second retention system 260 can be slightly or significantly different. For example, components of the first retention system 250, such as the retention member 252, can have different lengths as compared to components of the second retention system 260, such as retention member 262. As another example, components of the first retention system 250 can be coupled to the right earstem 220 at a position with respect to the right earstem 220, such as an inner side of the right earstem 220, and the second retention system 260 can be coupled to the left earstem 230 at a different position relative to the left earstem 230, such as an outer side of the left earstem 230.

Embodiment of Active Retention System on Support of Eyewear

Figure 3:
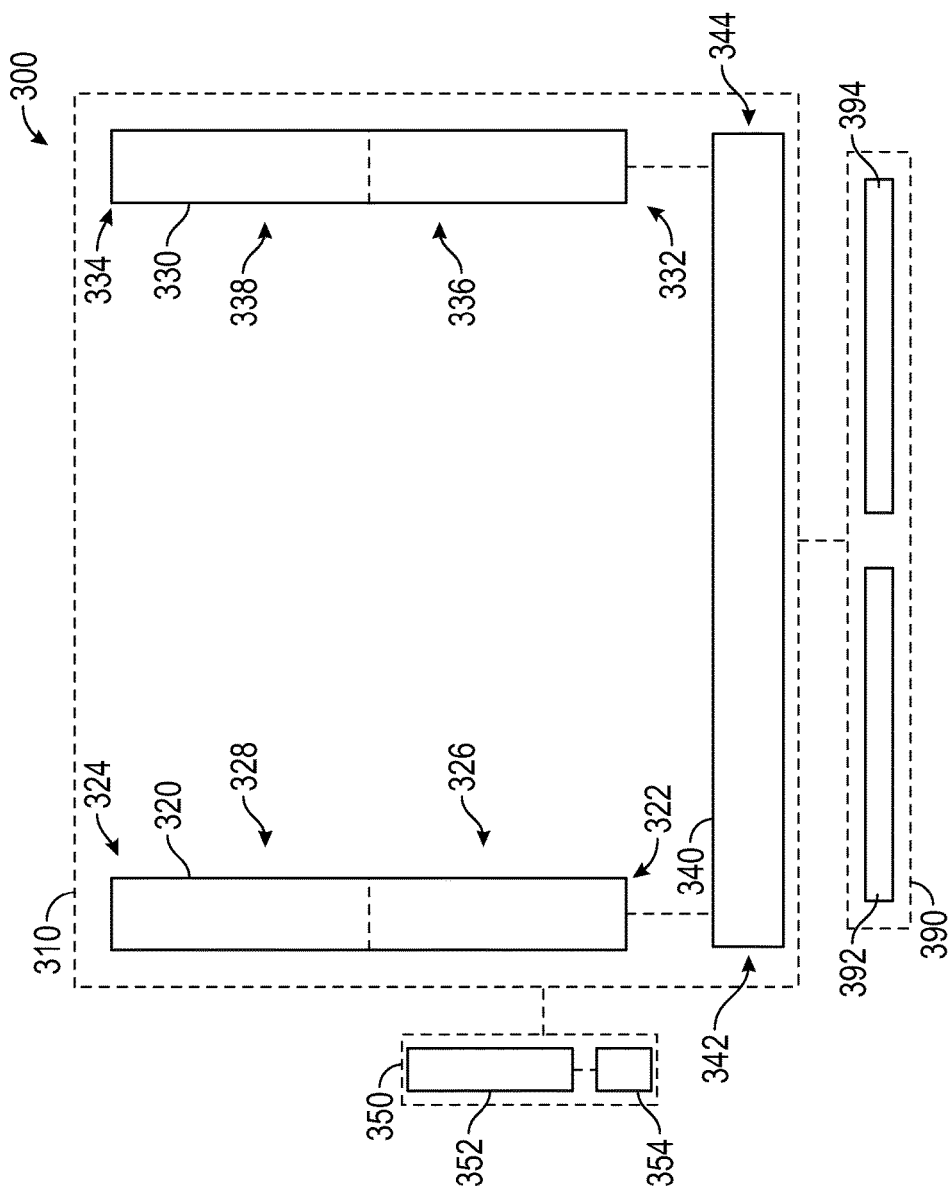
FIG. 3 illustrates a schematic of an embodiment of an eyewear having an active retention system.

With reference next to FIG. 3, an embodiment of an eyewear 300 is illustrated having a support 310. The eyewear 300 can include or share any or all of the components, features and/or characteristics described above in connection with eyewear 100, 200.

The support 310 can include a right earstem 320, a left earstem 330, and a face 340. The right earstem 320 can include an anterior end 322, a posterior end 324, an anterior portion 326, and a posterior portion 328. The left earstem 330 can similarly include an anterior end 332, a posterior end 334, an anterior portion 336, and a posterior portion 338. The face 340 can include a right side 342 and a left side 344 and be configured to support a lens 390, such as a right lens 392 and left lens 394. In some embodiments, the face 340 can be configured to surround at least a portion or an entirety of the periphery of the lens 390 such as lenses 392, 394. For example, the face 340 can include partial or full orbitals.

In some embodiments, the earstems, such as right and/or left earstems 320, 330, and/or face 340 can be fabricated using one or more metals, polymers, or other relatively stiff and/or resilient materials that can have desirable lens securing and stabilizing properties while nevertheless enabling the eyewear to provide desirable flexural properties in the earstems, such as right and/or left earstems 320, 330 thereof. For example, in some embodiments, titanium, carbon fiber, plastic, aluminum, and other such materials can be used in the earstems, such as right and/or left earstems 320, 330, and/or face 340 to provide superior mechanical properties while reducing the weight of the support 310. Any suitable metals, plastics or other rigid and/or resilient materials can be used to form the support 310 to provide exceptional rigidity, durability, and wear resistance. Nevertheless, various features and aspects disclosed herein can be used in eyewear fabricated from any material, e.g., plastic, acetate, composite, metal, etc., or any combination thereof. The lens 390, such as a right and/or left lens 392, 394, may take any of a number of configurations and can be formed of sheet plastic, molded plastic, glass, etc., as determined by the application of the lens.

As shown in the illustrated embodiment, the right earstem 320 and the left earstem 330 can be coupled to the face 340. For example, the right earstem 320 can be coupled to the right side 342 of the face 340 at or proximate an anterior end 322 of the right earstem 320 and the left earstem 330 can be coupled to the left side 344 of the face 340 at or proximate an anterior end 332 of the left earstem 330. In some embodiments, the right and/or left earstems 320, 330 can be permanently affixed to the face 344. A permanent attachment of the earstems, such as right and/or left earstems 320, 330, to the face 340 may be accomplished, for example, through molding or thermoplastic bonding. In some embodiments, the right and/or left earstems 320, 330 can be rotatably coupled to the face 344 via a rotatable coupling such as, but not limited to, a snap fit coupling or fasteners including screws or pins or any other rotatable coupling as desired.

In some embodiments where the right and/or left earstems 320, 330 are rotatably coupled to the face 340, the right and/or left earstems 320, 330 can rotate from an open position, in which the eyewear 300 can be worn by a user, to a closed position, in which the eyewear 300 takes on a more compact form factor for storage, and vice versa. In the open position, the right and/or left earstems 320, 330 can form an angle, such as an angle of between approximately 135 degrees to approximately 75 degrees with the face 340, or between approximately 125 degrees to approximately 80 degrees with the face 340, or between approximately 115 degrees to approximately 85 degrees with the face 340, or any sub-range within these ranges, or any other angle as desired. For example, the right and/or left earstems 320, 330 can be generally perpendicular to the face 340 in the open position. In the closed position, the right and/or left earstems 320, 330 can form an angle, such as an angle of between approximately 30 degrees to approximately −10 degrees with the face 340, or between approximately 20 degrees to approximately −5 degrees with the face 340, or between approximately 10 degrees to approximately 0 degrees with the face 340, or any sub-range within these ranges, or any other angle as desired. For example, the right and/or left earstems 320, 330 can be generally parallel to the face 340 in the closed position. In some embodiments, the right and/or left earstems 320, 330 can rotate, such as rotating between approximately 135 degrees to approximately 45 degrees from the closed position to the open position, or between approximately 120 degrees to approximately 60 degrees from the closed position to the open position, or between approximately 105 degrees to approximately 75 degrees from the closed position to the open position, or any sub-range within these ranges, or any other range as desired.

For example, the right and/or left earstems 320, 330 can rotate approximately 90 degrees from the closed position to the open position.

With continued reference to the embodiment of eyewear 300 illustrated in FIG. 3, the eyewear 300 can include a retention system 350. As noted above, the retention system 350 can be configured to retain the eyewear 300 on an object separate from the eyewear 300. As shown in the illustrated embodiment, the retention system 350 can include a retention member 352 and an actuation member 354. The retention system 350, such as the retention member 352 and/or the actuation member 354, can be coupled to a portion of the support 310. For example, the retention system 350 can be coupled to the right earstem 320, the left earstem 330, the face 340, and/or a combination of these components of the support 310. In some instances, components of the retention system 350 can be coupled to different components of the support 310. For example, the retention member 352 can be coupled to an earstem, such as earstems 320, 330, and/or the face 340 and the actuation member 354 can be coupled to the face 340.

In some embodiments, the coupling between the retention system 350 and the support 310 can be accomplished such that the retention system 350, or components thereof, can be removable from the support 310. For example, the retention system 350 can be coupled to the support 310 using removable fasteners such as threaded screws, threaded bolts, and the like. As another example, the retention system 350 can be coupled to the support 310 using removable fasteners such as a clip. In some embodiments, the retention system 350 can include a retention member 352 and/or actuation member 354 which is configured to clip onto or fit over a portion of the support 310 such that the retention system 350 can be removed from the support 310 without using tools such as a screwdriver. In some embodiments, the retention system 350 can be coupled to the portion of the support 310 using one or more permanent affixation methods such as, but not limited to, overmolding, one or more adhesives, and the like. In some embodiments, the retention system 350 can be unitarily formed with the portion of the support 310.

In some embodiments, the retention member 352 can be configured to retain the object, such as by forming a retaining relationship (e.g., with a gripping action, a clamping action, a pinching action, a compressing action, an adhering action, and/or a hooking action, etc.), between the support 310 and the retention member 352. In some embodiments, the retention member 352 can be configured to retain the object to the eyewear by itself (e.g., without forming a retaining relationship between the support 310 and the retention member 352), such as by forming a retaining relationship directly between the retention member 352 and the object. The retention member 352 can be sized and shaped to assist in retaining the eyewear 300 on the object. In some embodiments, the retention member 352 can have a length relative to another component of the eyewear 300 such as the support 310 or lens 390. For example, in some embodiments, the retention member 352 can have a length of between approximately 5% to approximately 60% of a length of an earstem, such as left and/or right earstems 320, 330, a length of between approximately 10% to approximately 50% of a length of an earstem, a length of between approximately 15% to approximately 40% of a length of an earstem, a length of between approximately 20% to approximately 30% of a length of an earstem, any sub-range within these ranges, or any percentage of the length of an earstem as desired, the length being a longitudinal length from an anterior end, such as anterior ends 322, 332, to a posterior end, such as posterior ends 324, 334.

In some embodiments, the retention member 352 can have a free end (see, for example, free ends 553a-e, 663, and 753 of FIGS. 5A-E, 8A, 8B, 9A, and 9B respectively) which is movable relative to a portion of the support 310 such that a portion of the object on which the eyewear 300 is to be retained can be passed between the free end and the support 310. In some embodiments, the retention member 352 can be actively actuated via use actuation member 354 which can move at least a portion of the retention member 352, such as the free end, relative to the support 310. In some embodiments, such movement can transition the retention member 352 from a retention configuration to an open configuration in which a distance between a portion of the retention member 352, such as the free end, and the support 310 is increased relative to the retention configuration. The increased distance in the open configuration can facilitate positioning of an object therebetween. In some embodiments, the retention member 352 can be actuated via use of the actuation member 354 from the open configuration to the retention configuration. In some embodiments, the actuation member 454 can be configured to actuate the retention member 452 from an open configuration to a retention configuration and vice versa.

In some embodiments, the actuation member 354 can include a stationary projection which interacts with the retention member 352 and the support 310 such that the retention member 352 is actuated when portions of the retention member 352 and/or support 310 are moved relative to each other. For example, the projection may be attached to a portion of the support 310, such as the face 340, which contacts at least a portion of the retention member 352 when another component of the support 310, such as the right earstem 320, is moved relative to the face 340. The projection can be positioned on other portions of the eyewear 300 such as, but not limited to, the right earstem 320, the left earstem 330, the retention member 352, a combination of these portions, or any other portion or combination as desired.

In some embodiments, the actuation member 354 can include a switch or button or slider or other actuator which interacts with the retention member 352 when the switch or button or slider or other actuator is actuated. For example, the actuator can be a push button which translates to contact a portion of the retention member 352. As another example, the actuator can be a push button which rotates to contact a portion of the retention member 352. Other types of acutators can be used such as, but not limited to, sliding switches and the like. Moreover, combinations of different types of actuators can be used.

To enhance retention between the retention member 352 and the support 310, the retention member 352 can be configured to impart a biasing force to the object positioned between the retention member 352 and the support 310. For example, the retention member 352 can be biased such that at least some portion of the free end imparts a biasing force or retention force against or on the object. In some embodiments, the retention member 352 can be biased towards the retention configuration.

For example, the retention member 352 can be formed from a resiliently deformable material and a portion of the retention member 352 can be positioned relative to the support 310 such that, when an object is positioned between the retention member 352 and the support 310 and/or when the retention system 350 is actuated, the retention member 352 is deformed. Due to the resiliency of the material, the retention member 352 can impart a biasing force. This biasing force can act on the object to clamp or clip the object between the retention member 352 and the support 310 and/or can tend to urge the retention system 350 back into an initial configuration, such as the retention configuration. In some embodiments, the retention member 152 can be formed from metals such as, but not limited to, steel, aluminum, and/or titanium, polymers, composites, combinations of such materials, and any other resiliently deformable materials or combination thereof as desired.

As another example, the retention system 350 can include a biasing member (not shown) such as, but not limited to, a torsion spring or linear spring. The biasing member can be coupled to the retention member 352 and/or the actuation member 354, or translatable or rotatable, or a combination of both, with respect to the retention member 352 and/or the actuation member 354, such that, when an object is positioned between the retention member 352 and the support 310 and/or when the retention system 350 is actuated, the retention member 352 can be translated and/or rotated away from the support 310. The biasing member can be configured to bias the retention member 352 towards the initial position such that, when the retention member 352 is moved away from the support 310, the retention member 352 can impart a biasing force on the object to clamp or clip the object between the retention member 352 and the support 310 and/or can tend to urge the retention system 350 back into an initial configuration, such as the retention configuration.

Although the retention system 350 described above includes an actuation member 354, the retention system 350 can also be passively actuated, such as via direct interaction between the retention system 350, the support 310, and the object to be positioned therebetween. For example, a user may decide to simply position the object between the retention member 352 and the support 310 without using the actuation member 354. As another example, the user may decide to simply position the object between the retention member 352 and the support 310 without completely actuating the actuation member 354 such as by only partially depressing the button or switch.

In some embodiments, the retention member 352 can be configured to retain the eyewear 300 on an object without imparting a biasing force on the object. For example, the retention member 352 may not be generally deformable. The free end of the retention member 352 can be spaced apart from a portion of the support 310 such that an object can be positioned between the retention member 352 and the support 310. The dimensions of the retention system 350, such as the retention member 352, and the positioning of the retention system 350 relative to the support 310 can be chosen to sufficiently retain the eyewear 300 without imparting a biasing force.

Embodiment of Active Retention Hinge System

Figure 4:
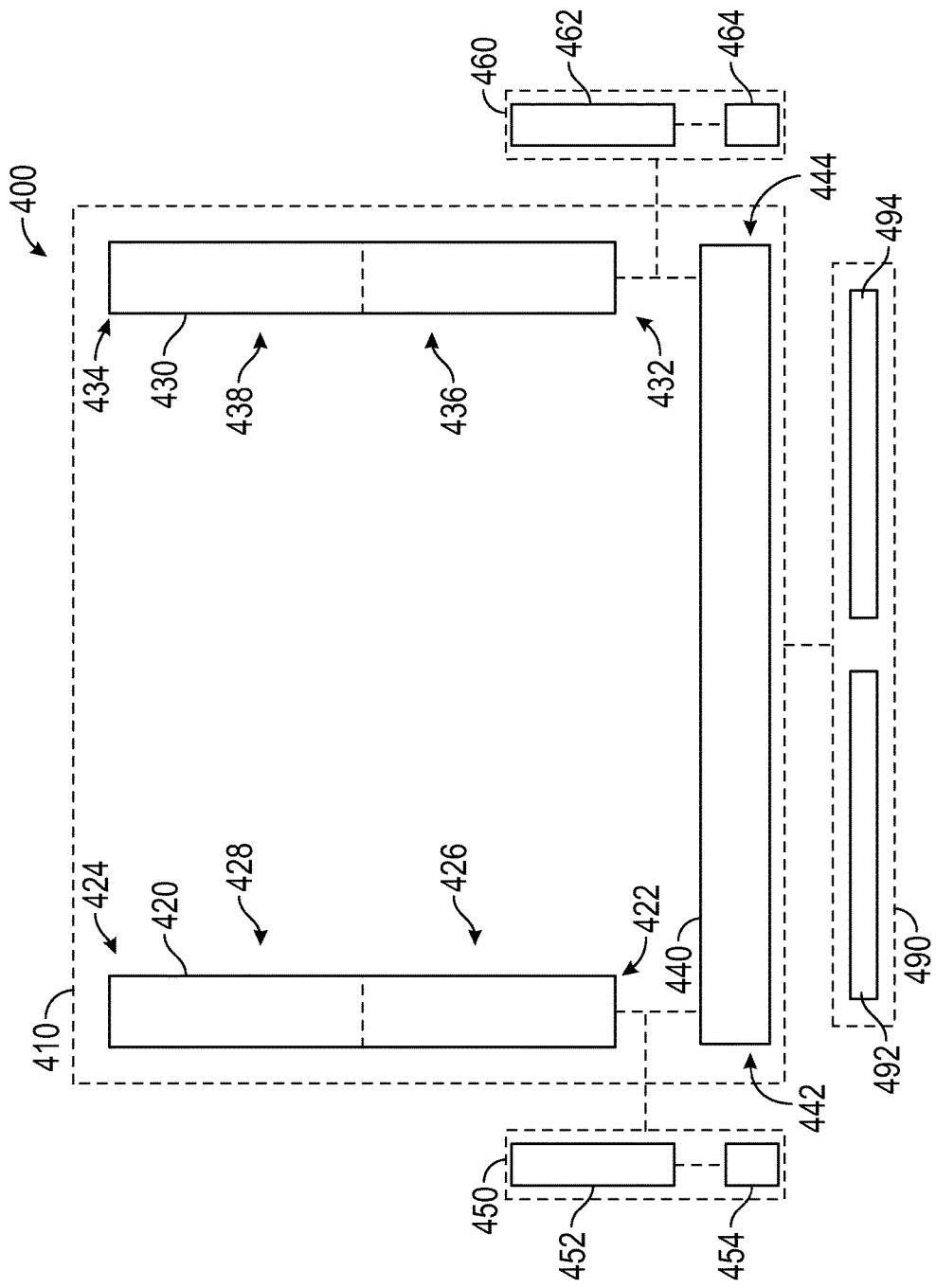
FIG. 4 illustrates a schematic of another embodiment of an eyewear having an active retention system, the active retention system forming at least part of the coupling between an earstem and a face.

With reference next to FIG. 4, an embodiment of an eyewear 400 is illustrated having a support 410. The eyewear 400 can include or share any or all of the components, features, and/or characteristics described above in connection with eyewear 100, 200, 300.

The support 410 can include a right earstem 420, a left earstem 430, and a face 440. The right earstem 420 can include an anterior end 422, a posterior end 424, an anterior portion 426, and a posterior portion 428. The left earstem 430 can similarly include an anterior end 432, a posterior end 434, an anterior portion 436, and a posterior portion 438. The face 440 can include a right side 442 and a left side 444 and be configured to support a lens 490, such as a right lens 492 and left lens 494. In some embodiments, the face 440 can be configured to surround at least a portion or an entirety of the periphery of the lens 490 such as lenses 492, 494. For example, the face 440 can include partial or full orbitals.

In some embodiments, the earstems, such as right and/or left earstems 420, 430, and/or face 440 can be fabricated using one or more metals, polymers, or other relatively stiff and/or resilient materials that can have desirable lens securing and stabilizing properties while nevertheless enabling the eyewear to provide desirable flexural properties in the earstems, such as right and/or left earstems 420, 430 thereof. For example, in some embodiments, titanium, carbon fiber, plastic, aluminum, and other such materials can be used in the earstems, such as right and/or left earstems 420, 430, and/or face 440 to provide superior mechanical properties while reducing the weight of the support 410. Any suitable metals, plastics or other rigid and/or resilient materials can be used to form the support 410 to provide exceptional rigidity, durability, and wear resistance. Nevertheless, various features and aspects disclosed herein can be used in an eyewear fabricated from any material, e.g., plastic, acetate, composite, metal, etc., or any combination thereof. The lens 490, such as a right and/or left lens 492, 494, may take any of a number of configurations and can be formed of sheet plastic, molded plastic, glass, etc., as determined by the application of the lens.

As shown in the illustrated embodiment, the right earstem 420 and the left earstem 430 can be coupled to the face 440. For example, the right earstem 420 can be coupled to the right side 442 of the face 440 at or proximate an anterior end 422 of the right earstem 420 and the left earstem 430 can be coupled to the left side 444 of the face 440 at or proximate an anterior end 432 of the left earstem 430. In some embodiments, the right and/or left earstems 420, 430 can be permanently affixed to the face 444. A permanent attachment of the earstems, such as right and/or left earstems 420, 430, to the face 440 may be accomplished, for example, through molding or thermoplastic bonding. In some embodiments, the right and/or left earstems 420, 430 can be rotatably coupled to the face 444 via a rotatable coupling such as, but not limited to, a snap fit coupling or fasteners including screws or pins or any other rotatable coupling as desired.

In some embodiments where the right and/or left earstems 420, 430 are rotatably coupled to the face 440, the right and/or left earstems 420, 430 can rotate from an open position, in which the eyewear 400 can be worn by a user, to a closed position, in which the eyewear 400 takes on a more compact form factor for storage, and vice versa. In the open position, the right and/or left earstems 420, 430 can form an angle, such as an angle of between approximately 135 degrees to approximately 75 degrees with the face 440, or between approximately 125 degrees to approximately 80 degrees with the face 440, or between approximately 115 degrees to approximately 85 degrees with the face 440, or any sub-range within these ranges, or any other angle as desired. For example, the right and/or left earstems 420, 430 can be generally perpendicular to the face 440 in the open position. In the closed position, the right and/or left earstems 420, 430 can form an angle, such as an angle of between approximately 30 degrees to approximately −10 degrees with the face 440, or between approximately 20 degrees to approximately −5 degrees with the face 440, or between approximately 10 degrees to approximately 0 degrees with the face 440, or any sub-range within these ranges, or any other angle as desired. For example, the right and/or left earstems 420, 430 can be generally parallel to the face 440 in the closed position. In some embodiments, the right and/or left earstems 420, 430 can rotate, such as rotating between approximately 135 degrees to approximately 45 degrees from the closed position to the open position, or between approximately 120 degrees to approximately 60 degrees from the closed position to the open position, or between approximately 105 degrees to approximately 75 degrees from the closed position to the open position, or any sub-range within these ranges, or any other range as desired. For example, the right and/or left earstems 420, 430 can rotate approximately 90 degrees from the closed position to the open position.

With continued reference to the embodiment of eyewear 400 illustrated in FIG. 4, the eyewear 400 can include a first retention system 450 and/or a second retention 460. As noted above, the retention systems 450, 460 can be configured to retain the eyewear 400 on an object separate from the eyewear 400. In some embodiments, a fewer or greater number of retention systems can be used.

As shown in the illustrated embodiment, the first retention system 450 can include a retention member 452 and/or an actuation member 454. The second retention system 460 can include a retention member 462 and/or an actuation member 464. At least a portion of the first retention system 450 can form a part of, or the entirety of, the coupling between the right earstem 420 and the face 440. At least a portion of the second retention system 460 can form a part of, or the entirety of, the coupling between the left earstem 430 and the face 440. In some embodiments, the first retention system 450 and/or second retention system 460 can be coupled to other portions of the support 410. For example, the first retention system 450 can be coupled to one earstem, such as the right or left earstems 420, 430 and the second retention system 450 can be coupled to the face 440. As another example, the first retention system 450 and the second retention system 460 can be coupled to the same component of the support 420, such as the right or left earstems 420, 430. In some cases in which the first retention system 450 and the second retention system 460 are attached to the same component, the first retention system 450 and the second retention system 460 can be attached to different portions and/or surfaces of the component.

For purposes of brevity, features and characteristics of the first retention system 450 will be described in greater detail below. The second retention system 460 can include or share any or all of the components, features, and/or characteristics of the first retention system 450 described below. In embodiments where the second retention system 460 is coupled to the left earstem 460, the description below of the first retention system 450 can be applied to the second retention system 460 with respect to the left earstem 460. Any component, feature, and/or characteristic that is illustrated and/or described in this specification with respect to either earstem can be used on the other earstem and/or on any other structure of an eyewear.

In some embodiments, the retention member 452 can be configured to retain the object, such as by forming a retaining relationship (e.g., with a gripping action, a clamping action, a pinching action, a compressing action, an adhering action, and/or a hooking action, etc.), between the support 410 and the retention member 452. In some embodiments, the retention member 452 can be configured to retain the object to the eyewear by itself (e.g., without forming a retaining relationship between the support 410 and the retention member 452), such as by forming a retaining relationship directly between the retention member 452 and the object. The retention member 452 can be sized and shaped to assist in retaining the eyewear 400 on the object.

In some embodiments, the retention member 452 can have a length relative to another component of the eyewear 400 such as the support 410 or lens 490. For example, in some embodiments, the retention member 452 can have a length of between approximately 5% to approximately 60% of a length of an earstem, such as left and/or right earstems 420, 430, a length of between approximately 10% to approximately 50% of a length of an earstem, a length of between approximately 15% to approximately 40% of a length of an earstem, a length of between approximately 20% to approximately 30% of a length of an earstem, any sub-range within these ranges, or any percentage of the length of an earstem as desired, the length being a longitudinal length from an anterior end, such as anterior ends 422, 432, to a posterior end, such as posterior ends 424, 434.

In some embodiments, the retention member 352 can have a free end (see, for example, free ends 553a-e, 663, and 753 of FIGS. 5A-E, 8A, 8B, 9A, and 9B respectively) which is movable relative to a portion of the support 410 such that a portion of the object on which the eyewear 400 is to be retained can be passed between the free end and the support 410. In some embodiments, the retention member 352 can be actively actuated via use actuation member 454 which can move at least a portion of the retention member 452, such as the free end, relative to the support 410. In some embodiments, such movement can transition the retention member 452 from a retention configuration to an open configuration in which a distance between a portion of the retention member 452, such as the free end, and the support 410 is increased relative to the retention configuration. The increased distance in the open configuration can facilitate positioning of an object therebetween. In some embodiments, the retention member 452 can be actuated via use of the actuation member 454 from the open configuration to the retention configuration.

With continued reference to the embodiment of eyewear 400 illustrated in FIG. 4 and as noted above, at least a portion of the first retention system 450 can form a part of, or the entirety of, the coupling between the right earstem 420 and the face 440. The actuation member 454 can be configured to actuate the retention member 452 from a retention configuration to an open configuration when the right earstem 420 is oriented relative to the face 440 in a desired manner. In some embodiments, the actuation member 454 can be configured to actuate the retention member 452 from the open configuration to the retention configuration when the right earstem 420 is oriented relative to the face 440 in a desired manner. In some embodiments, the actuation member 454 can be configured to actuate the retention member 452 from the open configuration to the retention configuration and vice versa based on the orientation of the right earstem 420 relative to the face 440.

For example, the actuation member 454 can be a stationary projection. The projection may be attached to a portion of the face 440 and/or the right earstem 420. The projection can be positioned relative to the right earstem 420, the face 440, and the retention member 452 such that the projection contacts at least a portion of the retention member 452 when the right earstem 420 is oriented relative to the face 440 in a desired manner.

In some embodiments, the first retention system 450 can be configured to actuate the retention member 452 from the retention configuration to the open configuration as the right earstem 420 is rotated from the open position towards an intermediate position between the open position and the closed position. As the earstem 420 is further rotated from the intermediate position towards the closed position, the first retention system 450 can return towards the retention configuration either via the actuation member and/or via a biasing member tending to urge the retention system 450 towards the initial, retention configuration. This can be particularly advantageous as this can follow a user's natural habit in storing the eyewear on an object such as the user's apparel. For example, the user may keep the right earstem 420 in a position between the open position and the intermediate position when positioning the eyewear 400 on the user's apparel. As the user begins to move the right earstem 420 further towards the intermediate position, the first retention system 450 can be actuated into the open configuration to facilitate positioning of the apparel between the retention member 452 and the right earstem 420. As the user further moves the right earstem 420 from the intermediate position towards the closed position, the retention system 450 can return towards the retention configuration to retain the eyewear 400 on the user's apparel.

In some embodiments, the first retention system 450 can be configured to actuate the retention member 452 from the retention configuration to the open configuration as the right earstem 420 is rotated from the closed position towards the intermediate position. As the earstem 420 is further rotated from the intermediate position towards the open position, the first retention system 450 can return towards the retention configuration either via the actuation member and/or via a biasing member tending to urge the retention system 450 towards the initial, retention configuration. This can be particularly advantageous as this can follow a user's natural habit in removing the eyewear from an object such as the user's apparel. For example, as the user removes the eyewear 400 from the user's apparel, the user may begin to move the right earstem 420 from the closed position towards the intermediate position. In so doing, the first retention system 450 can be actuated into the open configuration to facilitate removal of the apparel from between the retention member 452 and the right earstem 420. As the user further moves the right earstem 420 into the open position, the retention system 450 can return towards the retention configuration in which the retention member 452 is positioned closer to the support 410 thereby reducing overall form factor of the retention system 450.

In some embodiments, the intermediate position can be at a position located between approximately 30% to 70% of the full rotation of the right earstem 420 from the open position to the closed position, between approximately 35% to 65% of the full rotation of the right earstem 420 from the open position to the closed position, between approximately 40% to 60% of the full rotation of the right earstem 420 from the open position to the closed position, any other sub-range within these ranges, or any other percentage of the full rotation of the right earstem 420 from the open position to the closed position. In some instances, the intermediate position can be at a specific point between these ranges. For example, the intermediate position can be at about 50% of the full rotation of the right earstem 420 from the open position to the closed position. In other instances, the intermediate position can occur over a range of such positions. For example, the intermediate position can occur between approximately 45% to approximately 55%.

In some embodiments, the actuation can be gradual such that the first retention system 450 moves from the retention configuration to the open configuration in a gradual manner. For example, the first retention system 450 may begin to actuate as the right earstem 420 is rotated from the open position towards the intermediate position such that the distance between the retention member 452 and the right earstem 420 gradually increases until the intermediate position in reached. In some embodiments, the actuation can be less gradual, or may occur upon reaching the intermediate position.

To enhance retention between the retention member 452 and the support 410, the retention member 452 can be configured to impart a biasing force to the object positioned between the retention member 452 and the support 410. For example, the retention member 452 can be biased such at least some portion of the free end imparts a biasing force on the object. In some embodiments, the retention member 452 can be biased towards the retention configuration.

For example, the retention member 452 can be formed from a resiliently deformable material and a portion of the retention member 452 can be positioned relative to the support 410 such that, when an object is positioned between the retention member 452 and the support 410 and/or when the first retention system 450 is actuated, the retention member 452 is deformed. Due to the resiliency of the material, the retention member 452 can impart a biasing force. This biasing force can act on the object to clamp or clip the object between the retention member 452 and the support 410 and/or can tend to urge the retention system 450 back into an initial configuration, such as the retention configuration. In some embodiments, the biasing force can also interact with the right earstem 420 and/or the face 440 such that the right earstem 420 is biased away from the intermediate position. For example, the right earstem 420 can be biased towards the open position when the right earstem 420 is at a position between the open position and the intermediate position. As another example, the right earstem 420 can be biased towards the closed position when the right earstem 420 is at a position between the closed position and the intermediate position. In some embodiments, the retention member 452 can be formed from metals such as, but not limited to steel, aluminum, and/or titanium, polymers, composites, combinations of such materials, and any other resiliently deformable materials or combination thereof as desired.

As another example, the first retention system 450 can include a biasing member (not shown) such as, but not limited to, a torsion spring or linear spring. The biasing member can be coupled, translatable, rotatably, or a combination of both, to the retention member 452 and/or the actuation member 454 such that, when an object is positioned between the retention member 452 and the support 310 and/or when the first retention system 450 is actuated, the retention member 452 can be translated and/or rotated away from the support 410. The biasing member can be configured to bias the retention member 452 towards the initial position such that, when the retention member 452 is moved away from the support 410, the retention member 452 can impart a biasing force on the object to clamp or clip the object between the retention member 452 and the support 410 and/or can tend to urge the first retention system 450 back into an initial configuration, such as the retention configuration. In some embodiments, the biasing force can also interact with the right earstem 420 and/or the face 440 such that the right earstem 420 is biased away from the intermediate position. For example, the right earstem 420 can be biased towards the open position when the right earstem 420 is at a position between the open position and the intermediate position. As another example, the right earstem 420 can be biased towards the closed position when the right earstem 420 is at a position between the closed position and the intermediate position.

Although the first retention system 450 described above includes an actuation member 454, the retention system 450 can also be passively actuated, via direct interaction between the first retention system 450, the support 410, and the object to be positioned therebetween. For example, a user may decide to simply position the object between the retention member 452 and the support 410 without using the actuation member 454. As another example, the user may decide to simply position the object between the retention member 452 and the support 410 without completely actuating the actuation member 454 such as by only partially depressing the button or switch.

In some embodiments, the retention member 452 can be configured to retain the eyewear 400 on an object without imparting a biasing force on the object. For example, the retention member 452 may not be generally deformable. The free end of the retention member 452 can be spaced apart from a portion of the support 410 such that an object can be positioned between the retention member 452 and the support 410. The dimensions of the first retention system 450, such as the retention member 452, and the positioning of the first retention system 450 relative to the support 410 can be chosen to sufficiently retain the eyewear 400 without imparting a biasing force.

As noted above, the second retention system 460 can include or share any or all features and/or characteristics of the first retention system 450. In some embodiments, the first retention system 450 and the second retention system 460 can include or share any or all of the same characteristics. In some embodiments, the first retention system 450 and the second retention system 460 can be slightly or significantly different. For example, components of the first retention system 450, such as the retention member 452, can have different lengths as compared to components of the second retention system 460, such as retention member 462. As another example, components of the first retention system 450 can be coupled to the right earstem 420 at a position with respect to the right earstem 420 and the second retention system 460 can be coupled to the left earstem 430 at a different position relative to the left earstem 430.

Although the embodiments of supports 110, 210, 310, 410 described above can include faces 140, 240, 340, 440 to which lenses 190, 290, 390, 490 can be attached, in some embodiments the supports 110, 210, 310, 410 may not include faces 140, 240, 340, 440. For example, the earstems 120, 130, 220, 230, 320, 330, 420, 430 can be directly coupled to the lens, or can be coupled to structures attached to the lens as shown in FIGS. 11-14. See, for example, U.S. Pat. No. 9,188,792, U.S. Pat. No. 9,122,078 and International Publication No. WO 2015/148770, the entireties of each of which are herein incorporated by reference. In embodiments having dual lenses, such as lenses 192, 194, 292, 294, 392, 394, 492, 494, the two lenses can include a bridge (not shown) coupling the lenses together.

Although the embodiments of supports 110, 210, 310, 410 described above can include earstems, such as earstems 120, 130, 220, 230, 320, 330, 420, 430, in some embodiments the supports 110, 210, 310, 410 may not include faces 140, 240, 340, 440. For example, the supports 110, 210, 310, 410 may include a strap which can extend around the users head, such as a strap for use with a goggle.

Embodiments of Free Ends

FIGS. 5A-E illustrate top plan views of various embodiments of eyewear 500*a-e*, the eyewear 500*a-e*, each having systems 550*a-e* with retention members 552*a-e* illustrated in a retention configuration. In some embodiments, the retention members 552*a-e* can be coupled to anterior portions 526*a-e* of the earstems 520*a-e*. The earstems 520*a-e* can be coupled to faces 540*a-e*.

As shown in the illustrated embodiments, each of the retention members 552*a-e* can have one or more free ends 553*a-e* which are movable relative to a portion of the earstems 552*a-e* such that a portion of the object on which the eyewear 500*a-e* is to be retained can be passed between the free end and the earstem 520*a-e*. To enhance retention between the retention members 552*a-e* and the earstems 520*a-e*, the retention members 552*a-e* can be configured to impart a biasing force to the object positioned between the retention members 552*a-e* and the earstems 520*a-e*. For example, the retention members 152 can be biased such at least some portion of the free end imparts a biasing force on the object. In some embodiments, the retention system 150 can be passively actuated via direct interaction between the retention system 150, the support 110, and the object to be positioned therebetween and/or actively actuated as discussed above in connection with eyewear 100, 200, 300, 400.

With reference to the embodiment of retention member 552*a* illustrated in FIG. 5A, the retention member 552*a* can include a straight free end 553*a* which is generally aligned with the retention member 552*a*.

With reference next to the embodiment of retention member 552*b* illustrated in FIG. 5B, the retention member 552*b* can include a free end 553*b* in which a portion extends from the retention member 552*b* towards the earstem 520*b*. For example, as shown in the illustrated embodiment, the tip of the free end 553*b* can be curved radially towards the earstem 520*b*. This can advantageously allow the tip of the free end 553*b* to pinch or clamp onto an object positioned between the tip and the earstem 520*b*. Moreover, at least a portion of the retention member 552*b* can be positioned relative to the earstem 520*b* such that a space 555*b* exists between a portion of the retention member 552*b* and the earstem 520*b* when the retention member 552*b* is in the retention configuration. The space 555*b* can be used to receive portions of the object positioned between the earstem 520*b* and the retention member 552*b*.

With reference next to the embodiment of retention member 552*c* illustrated in FIG. 5C, the retention member 552*c* can include a free end 553*c* which curves radially towards the earstem 520*b*. As shown in the illustrated embodiment, the free end 553*c* can further curve such that a portion of the free end 553*c* extends in the anterior direction. Moreover, at least a portion of the retention member 552*c* can be positioned relative to the earstem 520*c* such that a space 555*c* exists between a portion of the retention member 552*c* and the earstem 520*c* when the retention member 552*c* is in the retention configuration. As shown in the illustrated embodiment, at least a portion of the retention member 552*c* can extend away from the earstem 520*c*. For example, the retention member 552*c* can include a bend such that a portion is angled away from the earstem 520*c*. This can advantageously increase the size of space 555*c*.

Figure 5E:
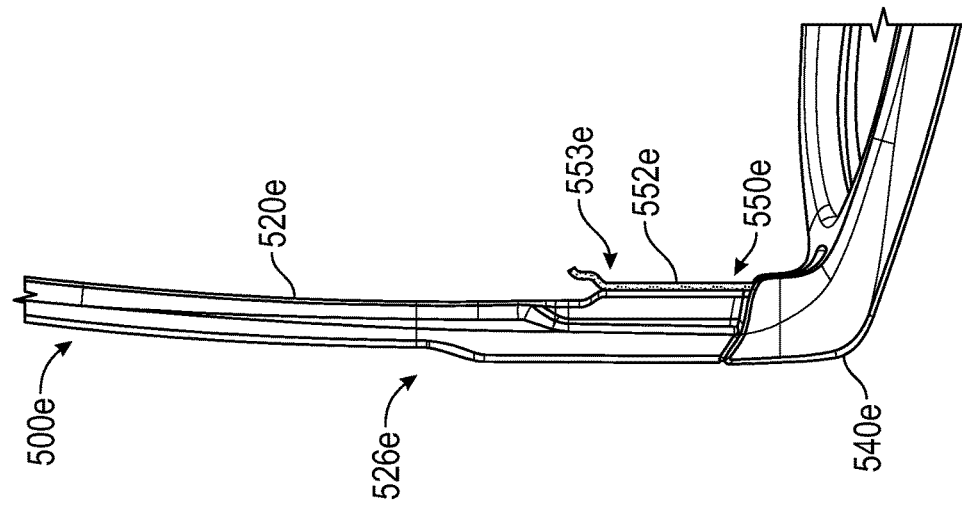
Figure 5D:
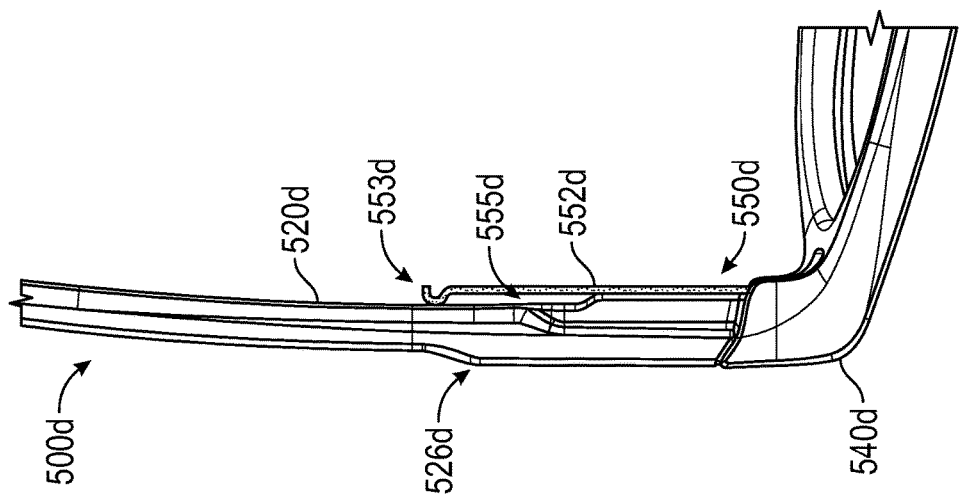

With reference next to the embodiment of retention member 552*d* illustrated in FIG. 5D, the retention member 552*d* can include a free end 553*d* in which a portion extends towards the earstem 520*d* and another portion extends away from the earstem 520*d*. For example, as shown in the illustrated embodiment, the tip of the free end 553*d* can include a first segment which is curved radially towards the earstem 520*d* and a second segment which is curved radially away from the earstem 520*d*. The radially inward bend can advantageously allow the tip of the free end 553*d* to remov- ably attach (e.g., pinch or clamp) onto an object positioned between the tip and the earstem 520*d* and the radially outward bend can advantageously facilitate placement of an object between the retention member 553*d* and the earstem 520*d* by functioning similar to a ramp. Moreover, at least a portion of the retention member 552*d* can be positioned relative to the earstem 520*d* such that a space 555*d* exists between a portion of the retention member 552*d* and the earstem 520*d* when the retention member 552*d* is in the retention configuration. The space 555*d* can be used to receive portions of the object positioned between the earstem 520*d* and the retention member 552*d*.

With reference to the embodiment of retention member 552*e* illustrated in FIG. 5E, the retention member 552*e* can include a free end 553*e* in which a portion extends away from the earstem 520*e*. For example, as shown in the illustrated embodiment, the tip of the free end 553*e* can include a segment which is angled away from the earstem 520*e*. The radially outward bend can advantageously facilitate placement of an object between the retention member 553*e* and the earstem 520*e* by functioning similar to a ramp.

Any of the characteristics and features of the retention members 552*a-e* can be applied to any other retention members described herein, such as retention members 152, 252, 262, 352, 452, 462 of eyewear 100, 200, 300, 400.

Embodiment of Rotatably Actuated Retention System

FIGS. 6-8B illustrate an embodiment of eyewear 600. The eyewear 600 can include or share some or all of the components, features and/or characteristics described above in connection with eyewear 400. The eyewear 600 can also include or share any or all of the components, features and/or characteristics described above in connection with eyewear 100 200, 300, 500.

Figure 6:
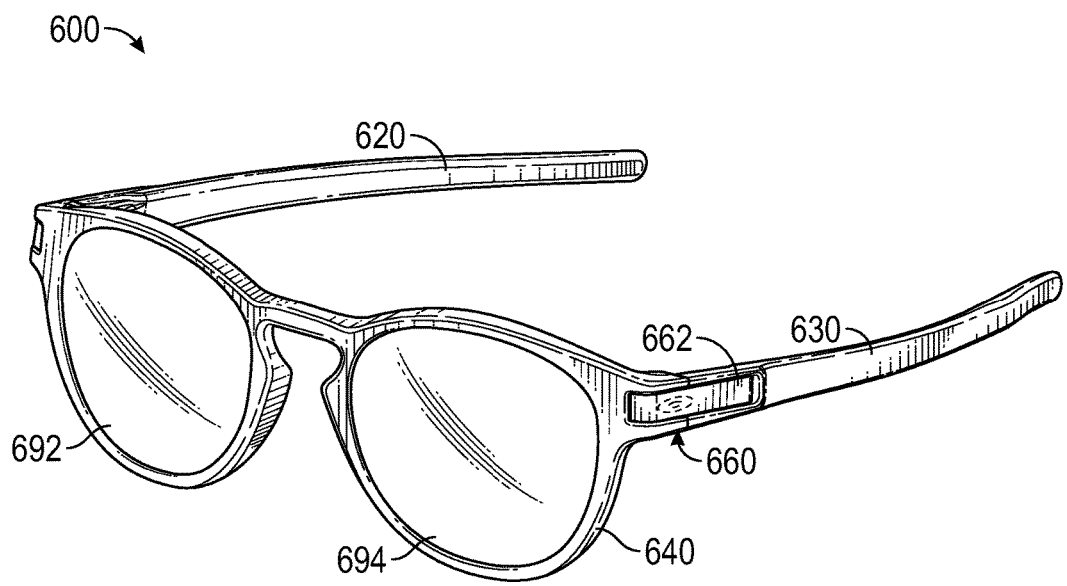
FIG. 6 illustrates a perspective view of another embodiment of an eyewear having an active retention system.
Figure 7:
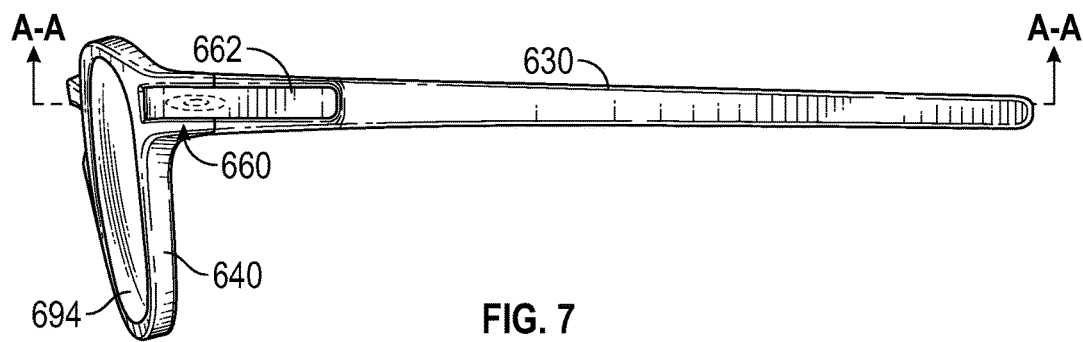
FIG. 7 illustrates a left side elevational view of the eyewear of FIG. 6.

With reference first to FIGS. 6 and 7, as shown in the illustrated embodiment, the eyewear 600 can include a right earstem 620 and left earstem 630 rotatably coupled to a face 640. The eyewear 600 can be a dual-lens eyewear. For example, the face 640 can be configured to hold a right lens 692 and a left lens 694. In some embodiments, the eyewear 600 can be a unitary lens eyewear. The eyewear 600 can include a retention system 660 having a retention member 662 coupled to the left earstem 630 and the face 640. Although not shown, the eyewear can include a similar retention system coupled to the right earstem 620 and the face 640.

Figure 8B:
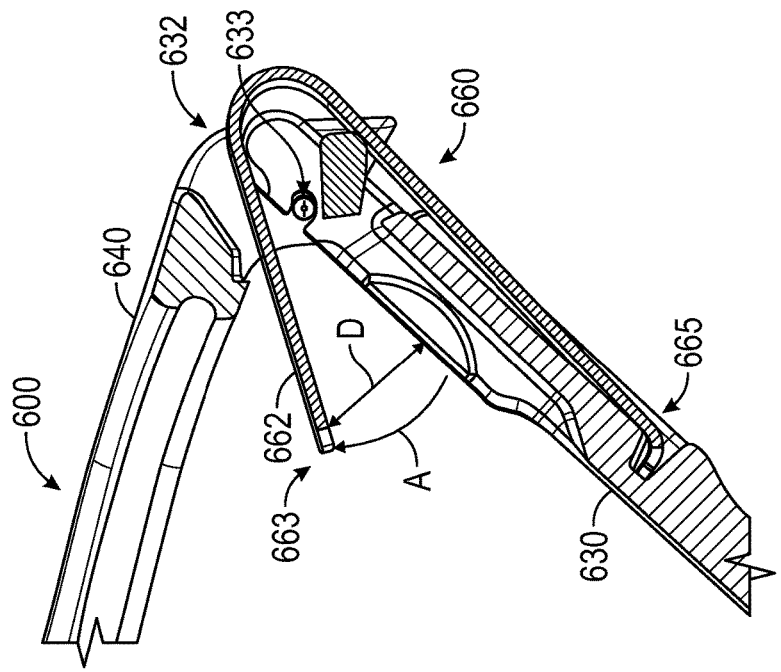
FIG. 8B illustrates a partial cross-sectional view of the eyewear of FIG. 6 along the line A-A, the eyewear being in a second configuration.
Figure 8A:
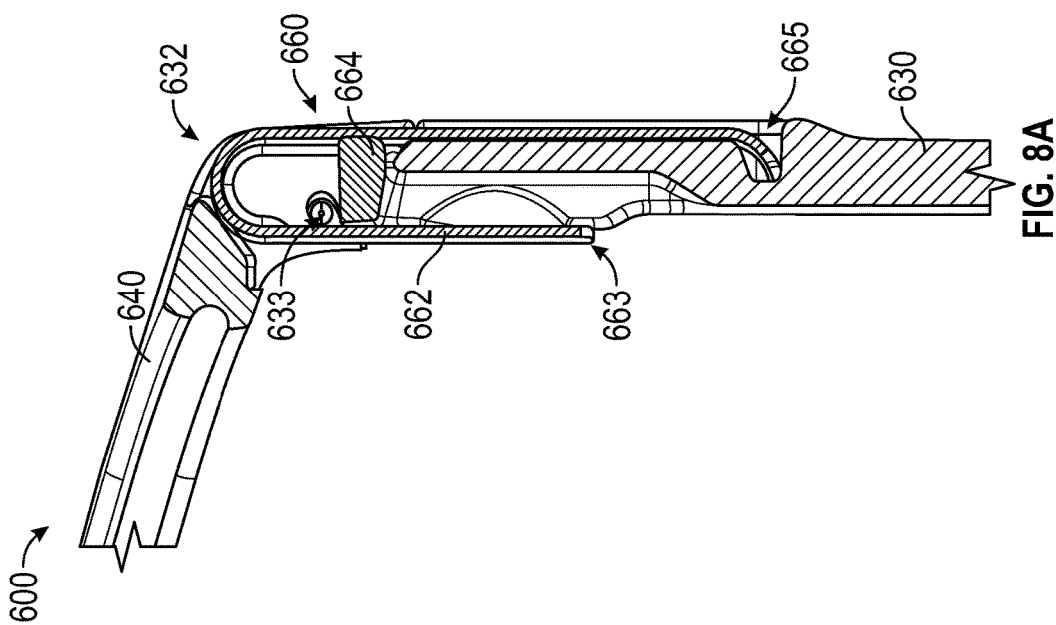
FIG. 8A illustrates a partial cross-sectional view of the eyewear of FIG. 6 along the line A-A, the eyewear being in a first configuration.

With reference next FIGS. 8A-B, the rotatable coupling between the left earstem 630 and the face 640 as well as the retention system 660 are illustrated in greater detail. As shown in the illustrated embodiment, the left earstem 630 can include a cavity 633 located at or proximate an anterior end 632 of the left earstem 630. The cavity 633 can be configured to receive a pin to rotatably couple the left earstem 630 to the face 640. For example, the cavity 633 can have a narrowed opening such that a pin can be retained within the cavity 633. The portion of left earstem 630 surrounding the cavity 633 can be formed from a resiliently deflectable material to allow a pin or similar device to be received within the cavity 633. As shown in the illustrated embodiment, the retention member 662 can cover the opening of cavity 633 at least when the retention member 662 is in a retention configuration to further secure a pin within the cavity 633.

As shown in the illustrated embodiment, the retention system 660 can include a retention member 662 and an actuation member 664. The retention member 662 extends along both an inner side and an outer side of the left earstem 630 and can be coupled to the left earstem 630 along the outer side. For example, the retention member 662 can include an end 665 which extends radially towards the left earstem 630 and fits within a cavity of the left earstem 630. This can advantageously allow a user to remove the retention member 662 without the need for any specialized tools. This can be beneficial, for example, in the user wants to change the retention member 662 to one having different characteristics such as, but not limited to, colors, biasing strength, shape, free end type, and the like. Other types of coupling mechanisms can be used such as fasteners or the like as described above in greater detail.

In this embodiment, the actuation member 664 can be in the form of a projection attached to a portion of the face 640. The projection can have a surface which contacts a surface of the retention member 662. As shown in the illustrated embodiment, as the left earstem 630 is rotated relative to the face 640, the interaction between the projection, the anterior end 632 of the left earstem 630, and the retention member 662 can cause the retention system 660 to actuate such that the retention system 660 transitions from a retention configuration as shown in FIG. 8A to an open configuration as shown in FIG. 8B as left earstem 630 rotates from an open position towards an intermediate position between the open position and a closed position. As shown in FIG. 8B, in the open configuration, the angle A formed between the left earstem 630 and the retention member 662 can increase to facilitate positioning of an object between the retention member 662 and the left earstem 630. Similarly, a distance D between the left earstem 630 and the free end 663 of the retention member 662 can increase to facilitate positioning of an object between the retention member 662 and the left earstem 630.

Embodiment of Switch Actuated Retention System

Figure 9A:
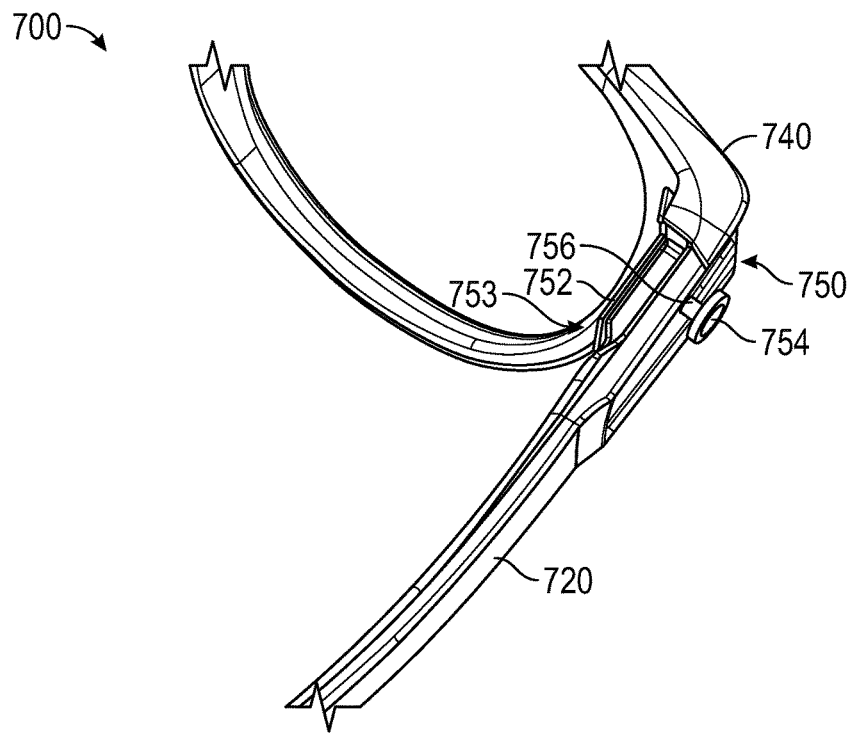
FIG. 9A illustrates a top perspective view of another embodiment of an eyewear having a retention system, the eyewear being in a first configuration.
Figure 9B:
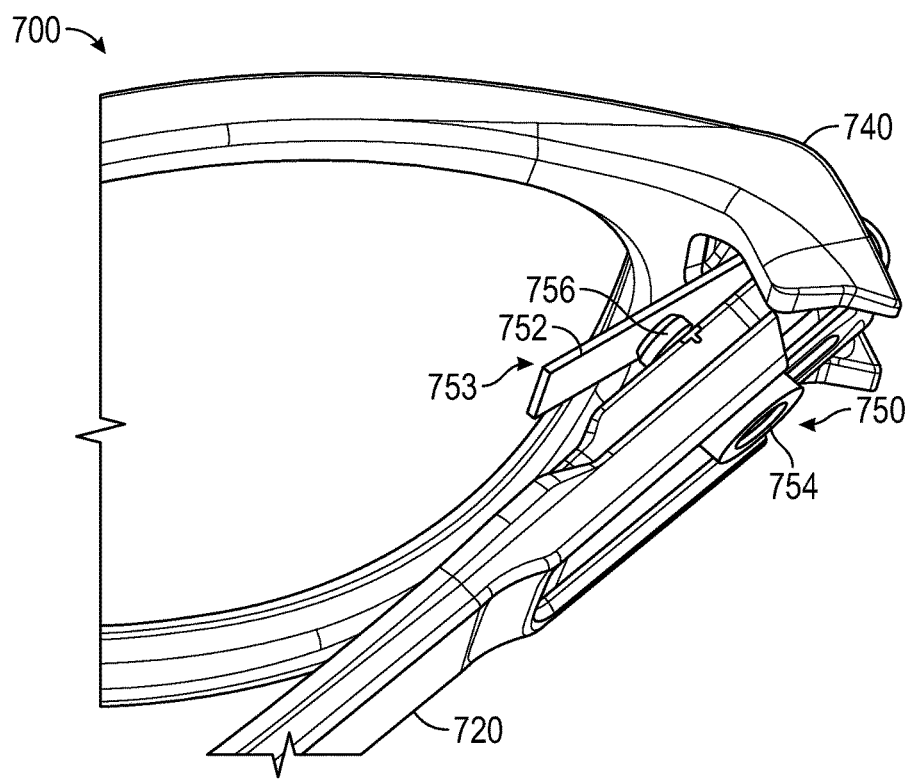
FIG. 9B illustrates a top perspective view of the eyewear of FIG. 9A, the eyewear being in a second configuration.

FIGS. 9A-B illustrate an embodiment of eyewear 700. The eyewear 700 can include or share any or all of the components, features and/or characteristics described above in connection with eyewear 300. The eyewear 700 can also include or share any or all of the components, features and/or characteristics described above in connection with eyewear 100, 200, 400, 500, 600.

As shown in the illustrated embodiment, the eyewear 700 can include a right earstem 720 rotatably coupled to a face 740. The eyewear can include a retention system 750 having a retention member 752 coupled to the right earstem 720. The retention member 752 can also be coupled to the face 740. Although not shown, the eyewear can include a similar retention system coupled to the left earstem (not shown) and/or the face 740.

As shown in the illustrated embodiment, the retention system 750 can include a retention member 752 and an actuation member 754. The retention member 752 can extend along one or both of an inner side and an outer side of the right earstem 720. In the illustrated embodiment, the actuation member 754 can be in the form of a translating switch attached to the right earstem 720. The switch can have a shaft 756 which passes through a portion of the right earstem 720 and contacts a surface of the retention member 752. As shown in the illustrated embodiment, as the switch is depressed, the interaction between the shaft 756 and the retention member 752 can cause the retention system 750 to actuate such that the retention system 750 transitions from a retention configuration as shown in FIG. 9A to an open configuration as shown in FIG. 9B. The retention member 752 can be biased such that the retention member 752 and the translatable switch return to their original positions when the translatable switch is not being depressed.

Figure 10A:
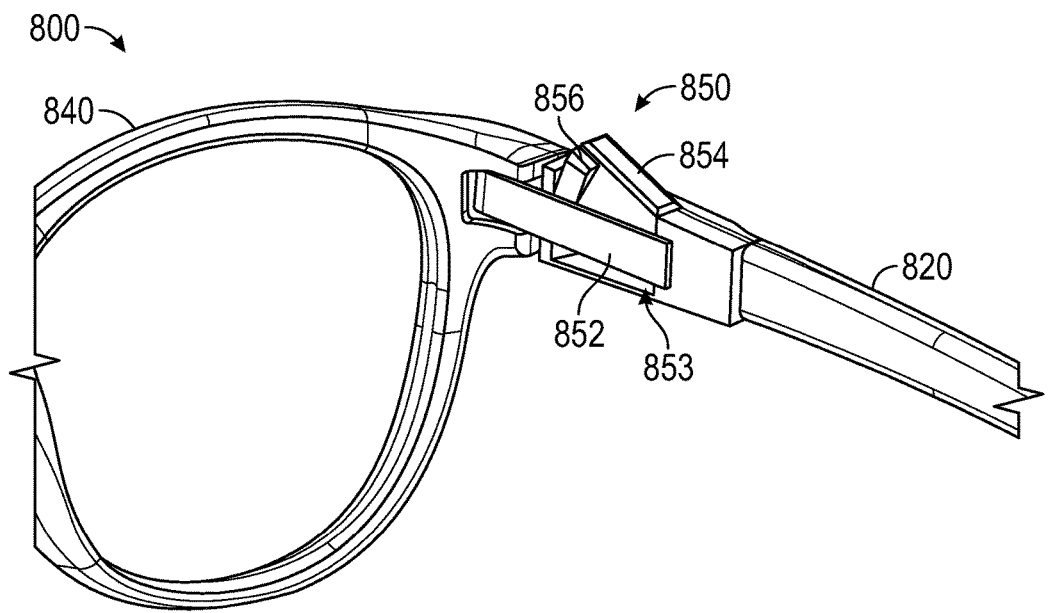
FIG. 10A illustrates a top perspective view of another embodiment of an eyewear having a retention system, the eyewear being in a first configuration.
Figure 10B:
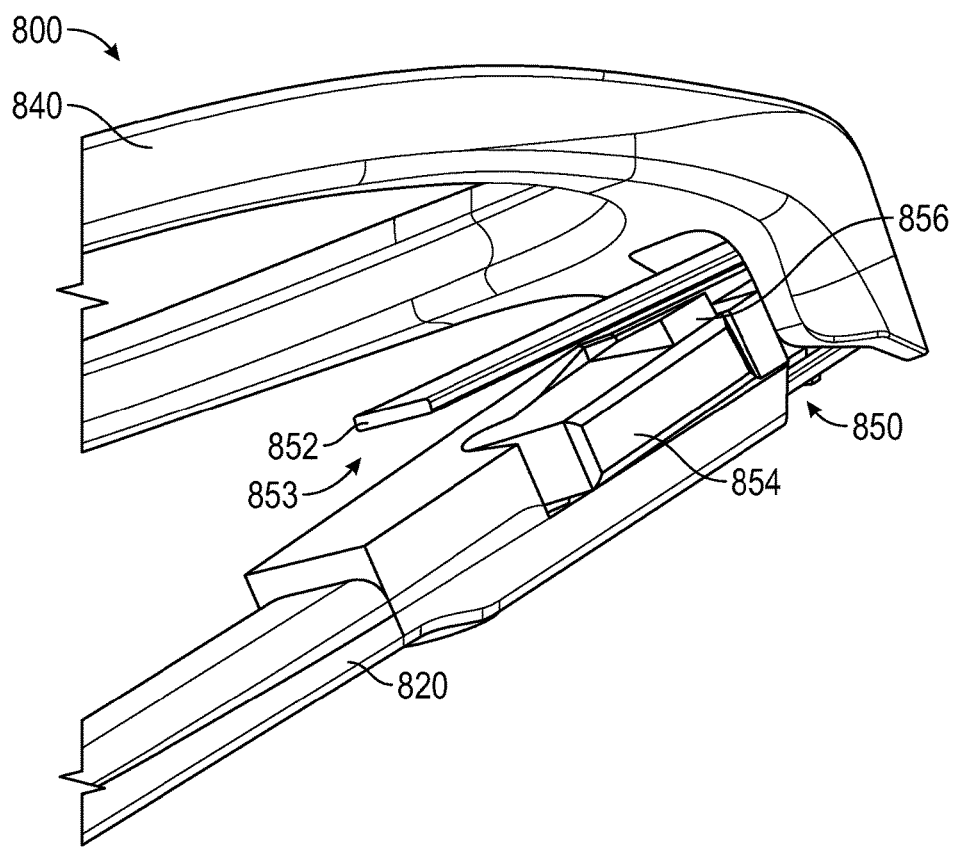
FIG. 10B illustrates a top perspective view of the eyewear of FIG. 10A, the eyewear being in a second configuration.
Figure 11:
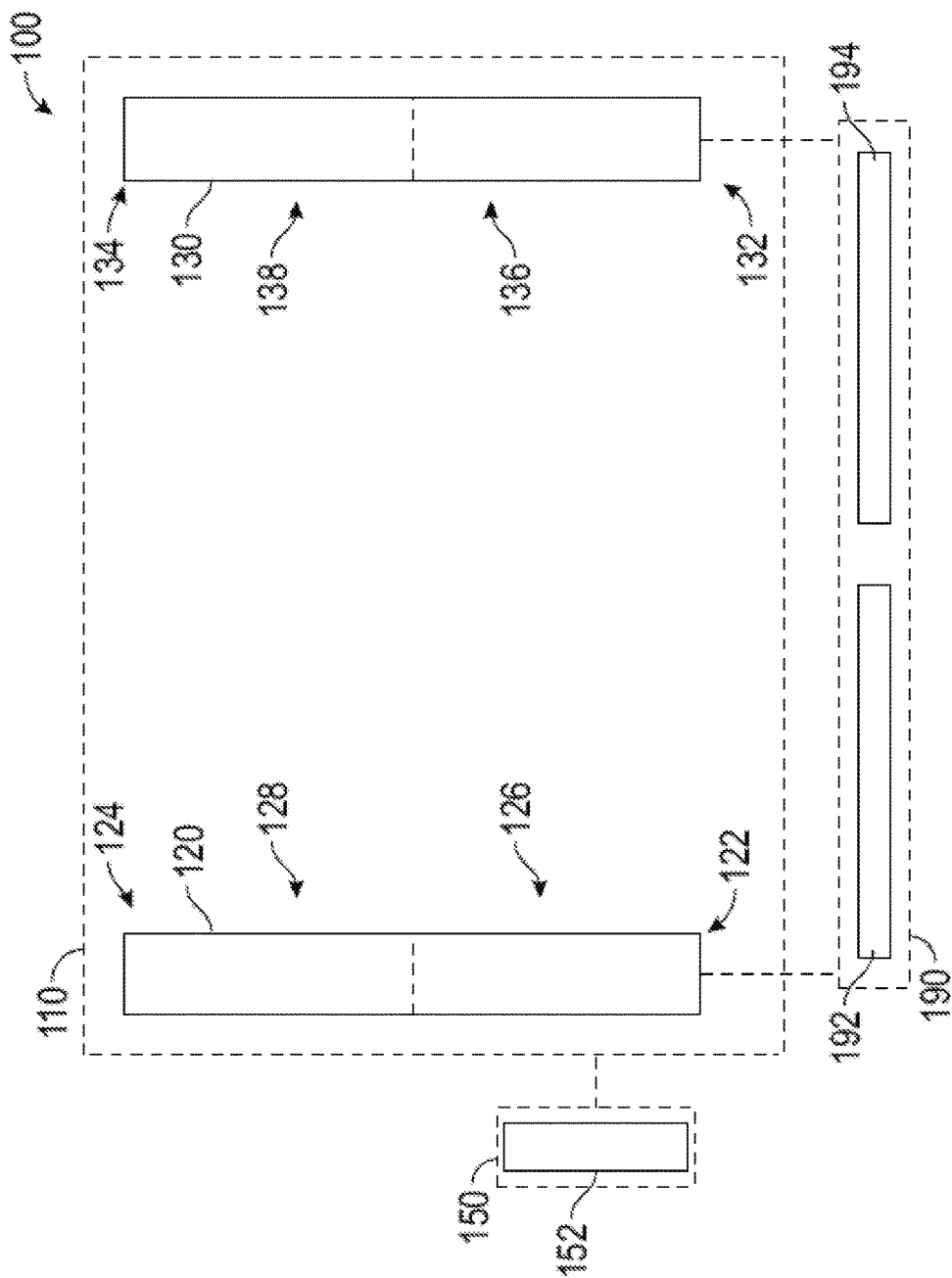
FIG. 11 illustrates a schematic of an embodiment of an eyewear having a retention system.
Figure 12:
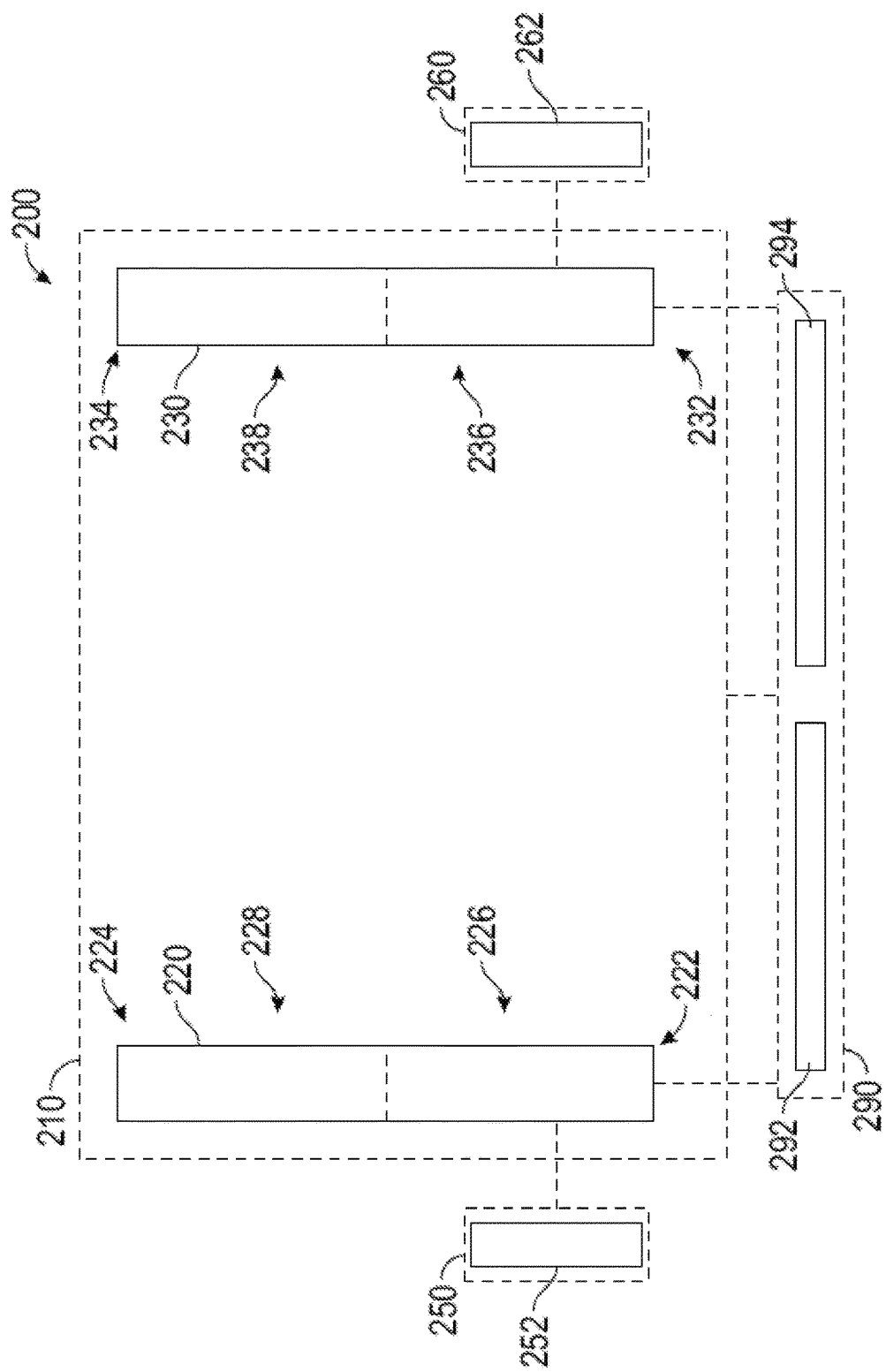
FIG. 12 illustrates a schematic of another embodiment of an eyewear having a retention system, the passive retention system including a retention member coupled to an earstem.
Figure 13:
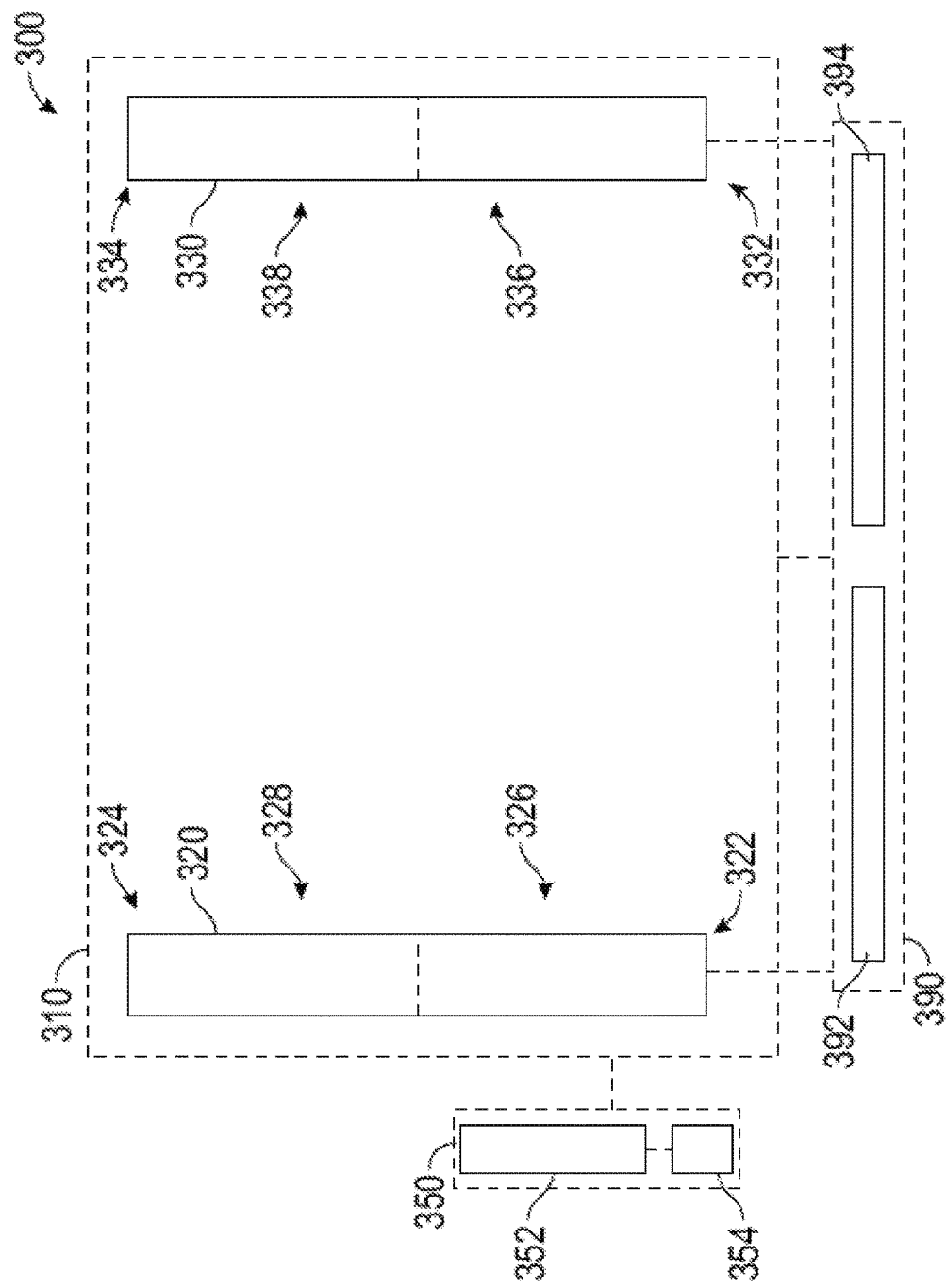
FIG. 13 illustrates a schematic of an embodiment of an eyewear having an active retention system.
Figure 14:
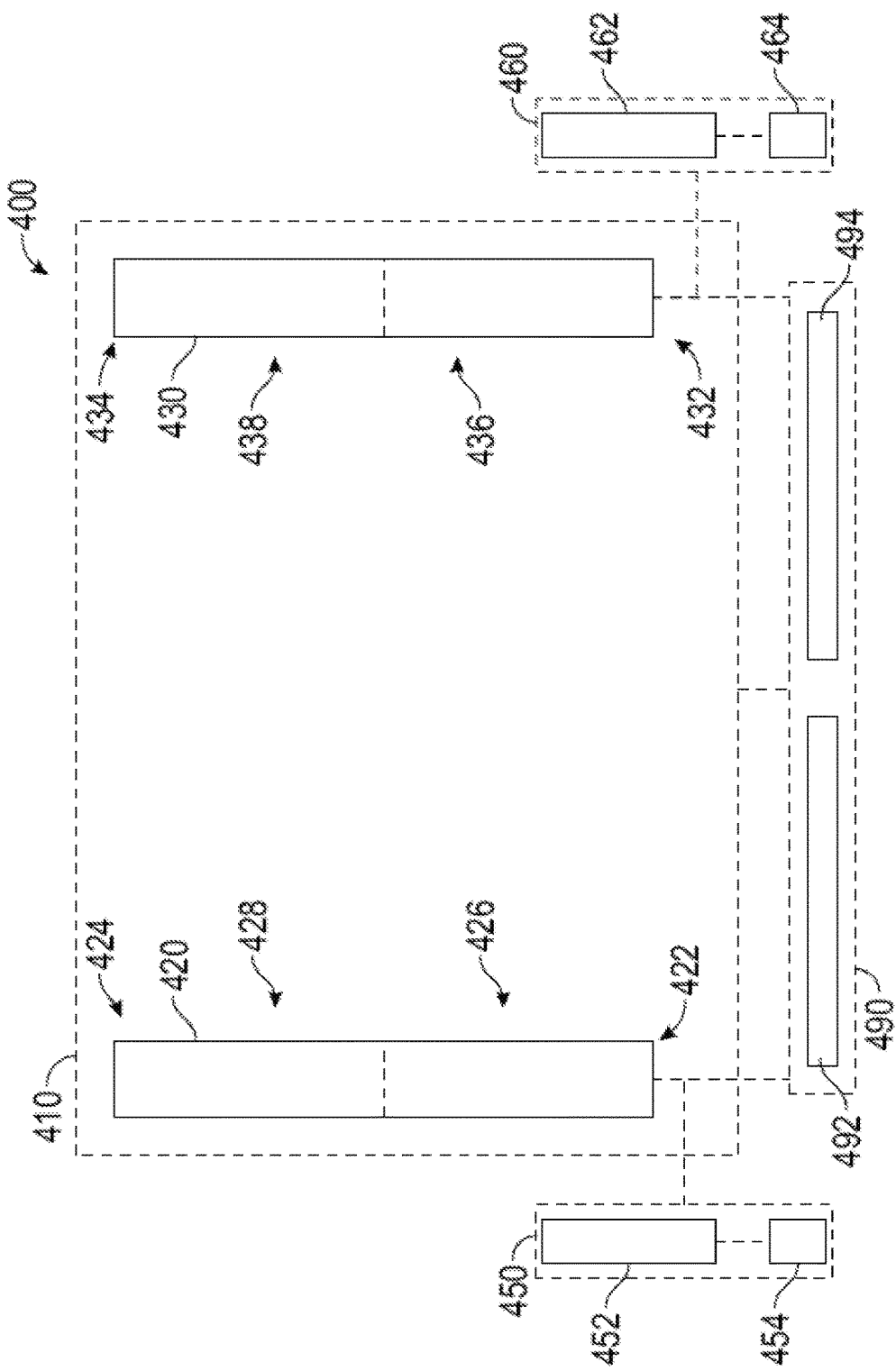
FIG. 14 illustrates a schematic of another embodiment of an eyewear having an active retention system.

FIGS. 10A-B illustrate an embodiment of eyewear 800. The eyewear 800 can include or share some or all of the components, features and/or characteristics described above in connection with eyewear 300, 700. The eyewear 800 can also include or share some or all of the components, features and/or characteristics described above in connection with eyewear 100, 200, 400, 500, 600.

As shown in the illustrated embodiment, the eyewear 800 can include a right earstem 820 rotatably coupled to a face 840. The eyewear can include a retention system 850 having a retention member 852 coupled to the right earstem 820. The retention member 852 can also be coupled to the face 840. Although not shown, the eyewear can include a similar retention system coupled to the left earstem (not shown) and/or the face 840.

As shown in the illustrated embodiment, the retention system 850 can include a retention member 852 and an actuation member 854. The retention member 852 can extend along one or both of an inner side and an outer side of the right earstem 820. In the illustrated embodiment, the actuation member 854 can be in the form of a rotatable switch attached to the right earstem 820. The switch can have a cammed surface 756 which contacts a surface of the retention member 852. As shown in the illustrated embodiment, as the switch is depressed, the interaction between the cammed surface 856 and the retention member 852 can cause the retention system 850 to actuate such that the retention system 850 transitions from a retention configuration as shown in FIG. 10A to an open configuration as shown in FIG. 10B. The retention member 852 can be biased such that the retention member 852 and the rotatable switch return to their original positions when the rotatable switch is not being depressed.

Other Embodiments

While certain embodiments have been described, these embodiments have been presented by way of example only, and are not intended to limit the scope of the disclosure. Indeed, the novel devices, system and methods described herein may be embodied in a variety of other forms. Furthermore, various omissions, substitutions and changes in the systems and methods described herein may be made. The accompanying claims and their equivalents are intended to cover such forms or modifications as would fall within the scope of the disclosure. Accordingly, the scope of the present disclosure is defined only by reference to the claims presented herein or as presented in the future.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that such features, elements and/or steps are in any way required for one or more embodiments.

Moreover, the following terminology may have been used herein. The singular forms "a," "an," and "the" include plural referents unless the context clearly dictates otherwise. Thus, for example, reference to an item includes reference to one or more of such items. The term "ones" refers to one, two, or more, and generally applies to the selection of some or all of a quantity. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The term "about," "approximately," or "generally," means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. For example, in some embodiments, the terms "about", "approximately", or "generally", may be within 20% of the stated value. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, in some embodiments, the terms "substantially" may be within 5% of the stated value.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

The following is claimed:

1. An eyewear comprising:
    a support configured to be carried on a head of a user, the support comprising:
        a face configured to support one or more lenses; and
        an earstem rotatably coupled to the face at or proximate an anterior end of the earstem, the earstem having an anterior portion positioned closer to the anterior end than to a posterior end;
    a retention system coupled to the support, the retention system comprising:
        a retention member having a free end, the retention member being configured to retain an object separate from the eyewear between the support and the retention member; and
        an actuation member configured to increase a distance between the free end of the retention member and the support to facilitate positioning of an object therebetween, the actuation member comprising a projection positioned on the face, the projection comprising a surface configured to contact a portion of the retention member when the earstem is pivoted relative to the face to increase the distance between the free end of the retention member and the support.

2. The eyewear of claim 1, wherein the retention member is formed from a resiliently deflectable material such that at least the free end is configured to impart a clamping force on the object positioned therebetween.

3. The eyewear of claim 1, wherein the retention member is coupled to the anterior portion of the earstem, wherein the retention member is configured to retain the object between the earstem and the retention member.

4. The eyewear of claim 3, wherein at least a portion of the retention member is spaced apart from the earstem.

5. The eyewear of claim 4, wherein at least a portion of the retention member at or proximate the free end is curved or angled towards the earstem.

6. The eyewear of claim 4, wherein at least a portion of the retention member at or proximate the free end is curved or angled away from the earstem.

7. The eyewear of claim 3, wherein the retention member extends along an inner side of the earstem.

8. The eyewear of claim 1, wherein:
    the earstem is configured to rotate between an open position and a closed position; and
    the projection is positioned relative to the support and the retention member such that the distance between the free end of the retention member and the support is greater when the earstem is in an intermediate position than when in at least one of the open position and the closed position, the intermediate position being between the open position and the closed position.

9. The eyewear of claim 1, wherein the retention system is configured to form at least part of the coupling between the face and the earstem.

10. The eyewear of claim 9, wherein:
    the earstem is configured to rotate between an open position and a closed position; and
    the retention system is configured to bias the earstem away from an intermediate position towards the open position or the closed position.

11. The eyewear of claim 1, further comprising at least one lens, wherein the at least one lens is coupled to the support.

12. The eyewear of claim 1, wherein:
the face comprises a pin;
the earstem comprises a cavity having an opening along a side of the earstem, the cavity configured to receive the pin via the opening;
the retention system is configured such that the distance between the free end of the retention member and the support is greater when the earstem is in an intermediate position than when in at least one of the open position and the closed position, the intermediate position being between the open position and the closed position;
the retention member is configured to extend along the side of the earstem when the earstem is in at least one of the open position and the closed position such that the retention member covers the opening of the cavity to inhibit removal of the pin from the cavity; and
the retention member is configured to move relative to the earstem when the earstem is in the intermediate position such that the opening is uncovered to facilitate removal of the pin from the cavity.

13. An eyewear comprising:
an earstem having an anterior portion positioned closer to an anterior end of the earstem than to a posterior end of the earstem; and
a retention system coupled to the earstem, the retention system comprising a resilient retention member having a free end, the retention member being configured to retain an object separate from the eyewear between the earstem and the retention member,
wherein the retention system is configured such that the distance between the free end of the retention member and the support is greater when the earstem is in an intermediate position than when in at least one of the open position and the closed position, the intermediate position being between the open position and the closed position, and
wherein the resilient retention member is configured to bias the earstem away from an intermediate position towards the open position or the closed position.

14. The eyewear of claim 13, wherein at least the free end of the retention member is configured to impart a clamping force on the object positioned therebetween.

15. The eyewear of claim 13, wherein at least a portion of retention member at or proximate the free end is curved or angled towards the earstem.

16. The eyewear of claim 13, wherein the eyewear further comprises an actuation system configured to increase a distance between the free end of the retention member and the earstem to facilitate positioning of an object therebetween.

17. The eyewear of claim 13, further comprising at least one lens, wherein the earstem is rotatably coupled to the lens.

18. The eyewear of claim 13, wherein:
the earstem comprises a cavity having an opening along a side of the earstem;
the retention member is configured to extend along the side of the earstem when the earstem is in at least one of the open position and the closed position; and
the retention member is configured to move relative to the earstem when the earstem is in the intermediate position such that the opening is uncovered.

19. An eyewear comprising:
a support configured to be carried on a head of a user, the support comprising:
a face configured to support one or more lenses; and
an earstem comprising a cavity having an opening along a side of the earstem; and
a retention system coupled to the support, the retention system comprising a retention member having a free end, the retention system being configured such that the distance between the free end of the retention member and the support is greater when the earstem is in an intermediate position than when in at least one of the open position and the closed position, the intermediate position being between the open position and the closed position;
wherein:
the retention member is configured to extend along the side of the earstem when the earstem is in at least one of the open position and the closed position such that the retention member covers the opening of the cavity; and
the retention member is configured to move relative to the earstem when the earstem is in the intermediate position such that the opening is uncovered.

20. The eyewear of claim 19, wherein:
the face comprises a pin;
the cavity is configured to receive the pin via the opening;
the earstem is configured to be removably coupled to the face via the pin and the cavity;
the retention member is configured to extend along the side of the earstem when the earstem is in at least one of the open position and the closed position such that the retention member covers the opening of the cavity to inhibit removal of the pin from the cavity; and
the retention member is configured to move relative to the earstem when the earstem is in the intermediate position such that the opening is uncovered to facilitate removal of the pin from the cavity.

* * * * *